(12) United States Patent
Yoshioka et al.

(10) Patent No.: US 10,309,501 B2
(45) Date of Patent: Jun. 4, 2019

(54) FRICTION ROLLER-TYPE TRANSMISSION

(71) Applicant: NSK LTD., Tokyo (JP)

(72) Inventors: Hiroyasu Yoshioka, Fujisawa (JP); Yasuyuki Matsuda, Fujisawa (JP); Kazutaka Tanaka, Fujisawa (JP); Takashi Imanishi, Fujisawa (JP)

(73) Assignee: NSK LTD., Tokyo (JP)

( * ) Notice: Subject to any disclaimer, the term of this patent is extended or adjusted under 35 U.S.C. 154(b) by 376 days.

(21) Appl. No.: 15/313,167

(22) PCT Filed: Mar. 25, 2015

(86) PCT No.: PCT/JP2015/059229
§ 371 (c)(1),
(2) Date: Nov. 22, 2016

(87) PCT Pub. No.: WO2015/178098
PCT Pub. Date: Nov. 26, 2015

(65) Prior Publication Data
US 2017/0191552 A1    Jul. 6, 2017

(30) Foreign Application Priority Data

May 23, 2014   (JP) ................................ 2014-107325

(51) Int. Cl.
*F16H 13/10*    (2006.01)
*F16H 13/08*    (2006.01)
*F16H 13/04*    (2006.01)

(52) U.S. Cl.
CPC ............. *F16H 13/10* (2013.01); *F16H 13/04* (2013.01); *F16H 13/08* (2013.01)

(58) Field of Classification Search
CPC ........... F16H 13/10; F16H 13/04; F16H 13/08
See application file for complete search history.

(56) References Cited

U.S. PATENT DOCUMENTS 3,837,233 A * 9/1974 French .................... F16H 15/28
476/39
5,379,661 A   1/1995 Nakano et al.
(Continued)

FOREIGN PATENT DOCUMENTS

EP    2 093 092 A2    8/2009
GB    1 341 665 A    12/1973
(Continued)

OTHER PUBLICATIONS

Written Opinion, issued by International Searching Authority in corresponding International Application No. PCT/JP2015/059229, dated Jun. 23, 2015, (PCT/ISA/237).
(Continued)

*Primary Examiner* — David M Fenstermacher
(74) *Attorney, Agent, or Firm* — Sughrue Mion, PLLC

(57) ABSTRACT

A sun roller of a friction roller-type transmission includes a movable sun roller element (23) capable of moving in an axial direction. Furthermore, the sun roller is provided with a loading cam mechanism which is formed along the circumferential direction of an input shaft (12), the loading cam mechanism having a first cam surface (75), a second cam surface (77) arranged facing the first cam surface (75) and secured to the input shaft (12), rolling elements (63) held between the first and second cam surfaces (75, 77), and an annular holding device (51), and the loading cam mechanism axially displacing the movable sun roller element (23). The holding device (51) has an inside-diameter-surface guiding part (81) for positioning the holding device relative to the input shaft by being fitted over the input shaft, the guiding part being provided to the inside diameter surface.

7 Claims, 20 Drawing Sheets

(56) References Cited

U.S. PATENT DOCUMENTS

| | | | | |
|---|---|---|---|---|
| 7,214,159 B2* | 5/2007 | Miller | ............... | B62M 9/08 475/214 |
| 7,727,106 B2* | 6/2010 | Maheu | ............... | F16H 15/38 476/1 |
| 8,313,405 B2* | 11/2012 | Bazyn | ............... | F16H 15/52 475/196 |
| 8,360,917 B2* | 1/2013 | Nichols | ............... | B62M 11/16 475/189 |
| 8,469,856 B2* | 6/2013 | Thomassy | ............... | F16H 15/28 476/40 |
| 8,900,085 B2* | 12/2014 | Pohl | ............... | F16H 15/50 475/189 |
| 8,956,262 B2* | 2/2015 | Tomomatsu | ............... | F16H 15/40 476/38 |
| 8,961,363 B2* | 2/2015 | Shiina | ............... | F16H 15/40 475/189 |
| 8,992,376 B2* | 3/2015 | Ogawa | ............... | F16H 15/52 476/38 |

FOREIGN PATENT DOCUMENTS

| | | |
|---|---|---|
| JP | 52-133881 U | 10/1977 |
| JP | 2-180346 A | 7/1990 |
| JP | 9-144825 A | 6/1997 |
| JP | 11-44351 A | 2/1999 |
| JP | 2003-21207 A | 1/2003 |
| JP | 3500923 B2 | 2/2004 |
| JP | 3508385 B2 | 3/2004 |
| JP | 3887924 B2 | 2/2007 |
| JP | 2008-106923 A | 5/2008 |

OTHER PUBLICATIONS

International Search Report, issued by International Searching Authority in corresponding International Application No. PCT/JP2015/059229, dated Jun. 23, 2015, (PCT/ISA/210).

Communication issued by the European Patent Office dated Dec. 13, 2017 in counterpart European Patent Application No. 15795781.2.

* cited by examiner

FRICTION ROLLER-TYPE TRANSMISSION

TECHNICAL FIELD

The present invention relates to a friction roller-type transmission.

RELATED ART

A friction roller-type transmission, which is to be incorporated into a driving apparatus for an electric vehicle such as an electric automobile, a hybrid automobile, an electric four-wheel-drive vehicle or the like or a driving apparatus for an industrial machine, is suggested in Patent Document 1, for example. The friction roller-type transmission is configured to transmit a rotation driving force of a driving unit such as an electric motor to a driven unit while decreasing or increasing speed. FIG. 18 is a sectional view of an example of the friction roller-type transmission. In the friction roller-type transmission, an annular roller 1 and a pair of sun roller elements 2A, 2B which are sun rollers are concentrically disposed. Also, a plurality of intermediate rollers 3 is disposed to be freely rotatable at circumferentially equal intervals by an intermediate roller holder 4 in a space between the annular roller 1 and the pair of sun roller elements 2A, 2B. The sun roller elements 2A, 2B are supported to an input shaft 5. A cam ring 6 fixed to the input shaft 5 is disposed at a side of the sun roller element 2B opposite to a side of the sun roller element 2A. The sun roller element 2A is configured to rotate together with the input shaft 5. The sun roller element 2B is provided to be freely moveable in an axial direction relative to the input shaft 5, and rotary torque is transmitted thereto via the cam ring 6. The rotary torque to the cam ring 6 is transmitted from the input shaft 5 by a key, a spline or the like.

Also, as shown in FIG. 19, respective facing surfaces of the cam ring 6 and the sun roller element 2B are formed with cam surfaces 7 at a plurality of places along a circumferential direction, and rolling elements (steel balls) 8 is sandwiched between the pair of facing cam surfaces 7, 7. By the cam surfaces 7, 7 and the rolling elements 8, a loading cam mechanism 9 (refer to FIG. 18) configured to transmit power between the cam ring 6 and the sun roller element 2B is configured.

The rotary torque applied to the input shaft 5 of the friction roller-type transmission is transmitted to an output shaft 11 via the sun roller elements 2A, 2B, the intermediate rollers 3, the annular roller 1 and a coupling bracket 10.

As described later, the loading cam mechanism 9 is configured to apply an axial force corresponding to the rotary torque of the input shaft 5 upon rotation of the input shaft 5. The sun roller element 2B is configured to move in a direction in which a distance between the sun roller elements 2A and 2B narrows, so as to follow respective elastic deformations of the sun roller elements 2A, 2B, the intermediate rollers 3, the annular roller 1 and the coupling bracket 10.

FIGS. 20A and 20B are sectional views taken along a line XX-XX of FIG. 19, pictorially illustrating the loading cam mechanism 9. As shown in FIG. 20A, the rolling element 8 of the loading cam mechanism 9 is configured to enter bottom portions of the cam surfaces 7, 7 or sides close to the bottom portions at a state where the rotary torque is not applied to the input shaft 5. When the rotary torque is applied to the input shaft 5 of the friction roller-type decelerator from this state, the rolling element 8 relatively moves from the bottom portions of the cam surfaces 7, 7 toward shallow portions as the cam ring 6 is rotated, as shown in FIG. 20B. At this time, an axial distance δ between the cam ring 6 and the sun roller element 2B increases.

Thereby, the sun roller element 2B is pressed toward the other sun roller element 2A, so that contact pressures between the sun roller elements 2A, 2B and the intermediate rollers 3 increase. At the same time, contact pressures between the intermediate rollers 3 and the annular roller 1 also increase. As a result, the contact pressure of each roller changes depending on a magnitude of the rotary torque to be transmitted between the input shaft 5 and the output shaft 11 shown in FIG. 18, so that it is possible to transmit the power without generating excessive sliding of each roller.

CITATION LIST

Patent Documents

Patent Document 1: Japanese Patent Application Publication No. 2008-106923A

Patent Document 2: Japanese Patent No. 3,500,923B

SUMMARY

Problems to be Solved

However, when the input shaft 5 rotates at high speed, a high centrifugal force is applied to the rolling elements 8 of the loading cam mechanism 9. As shown in FIG. 21, the rolling element 8 is disposed to be held on the cam surfaces 7, 7. For this reason, when the centrifugal force Fc is applied to the rolling element 8, axial component forces (thrust Ft) are applied in correspondence to contact angles of contact points between the rolling element 8 and the cam surfaces 7, 7, as shown in FIG. 22. The applied thrust Ft is determined by magnitudes of the centrifugal force Fc and the contact angle. However, it is difficult to precisely determine the magnitudes of the contact angles upon the design. For this reason, when the input shaft 5 rotates at high speed, the thrust Ft that is difficult to be quantitatively estimated is applied to the sun roller element 2B and the cam ring 6. When the thrust Ft is excessively high, loss of the transmission increases, so that power transmission efficiency is lowered. Therefore, the thrust is preferably suppressed as low as possible.

Therefore, it has been known that a holding device configured to receive the centrifugal force is disposed between the sun roller element 2B and the cam ring 6 so as to suppress the excessive thrust due to the centrifugal force that is to be applied to the rolling element 8. When the holding device is provided, it is necessary to restrain an axial position and inclination of the holding device so as to receive the centrifugal force that is to be applied to the rolling element 8 and to prevent separation and biting of the rolling element 8 from the holding device.

When the rotary torque is applied to the sun roller element 2B and the cam ring 6, a component to which the thrust Ft is applied is elastically deformed. In correspondence to an amount of the elastic deformation, the sun roller element 2B and the cam ring 6 slightly rotate relative to each other. The axial distance δ (refer to FIG. 20B) between the sun roller element 2B and the cam ring 6 increases in connection with the relative rotation. However, it is required to make a structure capable of restricting the axial position and inclination of the holding device even at a state where the axial distance increases.

Patent Document 2 discloses a technology of providing the holding device with a protrusion so as to prevent the inclination of the holding device. In Patent Document 2, the stability of the rotation operation is improved by preventing the inclination of the holding device. However, when the friction roller-type transmission is attached to a motor configured to rotate at ultrahigh speed exceeding 30,000 rpm, the centrifugal force to be applied to the rolling element is high under ultrahigh-speed rotation, and strength of the holding device configured to receive the centrifugal force is problematic. In particular, a pocket of the holding device has a small sectional area, and when the sectional area is changed due to the pocket, the stress concentration is likely to occur. Since it is necessary to increase the strength so as to form the protrusion at the holding device, a member is likely to be enlarged.

In general, the sun roller is rotated at ultrahigh-speed conditions where the maximum rotating speed is about 40,000 rpm. For this reason, it is important for the friction roller-type transmission to make a dynamic balance as good as possible upon the rotation, i.e., to lower a remaining unbalance amount so as to reduce vibration and noise of the entire transmission. As compared to an internal combustion engine-type automobile of the related art, an electric automobile is required to have quietness. Therefore, it is particularly important to reduce the noise and sound that are to be generated by a device.

In order to make the dynamic balance good upon the rotation, a method of checking the dynamic balance of the transmission upon the rotation at an assembled state as shown in FIG. 18 and additionally performing processing for each member of the transmission or adding any component to correct the balance is performed. However, when there is no method of securing a shaft center for the holding device and the other part (for example, an inner diameter-side shaft of the holding device), the holding device is guided to the shaft center by the rolling elements. In order to correct the dynamic balance of the holding device that is guided by the rolling elements at the assembled state of the transmission, the sun roller and the rolling elements for rotatably supporting the holding device are required. Also, the centrifugal force is applied to the rolling elements, so that the thrust is applied in a direction in which the sun roller and the cam ring separate from each other. For this reason, a jig and the like are required so as not to axially separate the corresponding members.

Also, the vibration precision of the holding device upon the rotation is determined by sizes and position precisions of the sun roller, the cam surface formed on the cam ring, the rolling element and the pocket of the holding device. Like this, when the plurality of components is more highly associated with each other, the vibration precision is more likely to be deteriorated and the remaining unbalance amount at the assembled state is more likely to increase.

It is therefore an object of the present invention to provide a friction roller-type transmission capable of configuring a loading cam mechanism as a structure having an excellent dynamic balance so that power transmission efficiency is not lowered upon high-speed rotation.

Means for Solving the Problems

The present invention is configured as follows.
(1) A friction roller-type transmission including:
an input shaft,
a sun roller disposed concentrically with the input shaft and having a rolling contact surface on an outer peripheral surface thereof, an annular roller disposed concentrically with the sun roller at an outer periphery-side of the sun roller and having a rolling contact surface on an inner peripheral surface thereof, a plurality of intermediate rollers supported to be rotatable about an axis of rotation arranged in parallel with the input shaft in an annular space between the rolling contact surface of the sun roller and the rolling contact surface of the annular roller and configured to rolling-contact the outer peripheral surface of the sun roller and an inner peripheral surface of the annular roller, and an output shaft connected to an axial side surface of the annular roller or to the intermediate rollers, wherein the sun roller includes a pair of sun roller elements divided in an axial direction of the input shaft, and wherein at least one of the pair of sun roller elements is a moveable sun roller element configured to be freely moveable in the axial direction, the friction roller-type transmission further including a loading cam mechanism including a first cam surface formed along a circumferential direction of the input shaft and having an axial depth gradually changing in the circumferential direction, a second cam surface disposed to face the first cam surface, a rolling element held between the first and second cam surfaces, and an annular holding device configured to hold the rolling element in a pocket, the loading cam mechanism being configured to rotate any one of the first and second cam surfaces together with the input shaft and to axially displace the moveable sun roller element, and wherein the holding device has an inner diameter surface guiding part provided on an inner diameter surface and configured to be fitted over the input shaft and to thereby position the holding device relative to the input shaft.

(2) In the friction roller-type transmission of (1), wherein the first cam surface is formed at a plurality of places along the circumferential direction on an outer end surface of the moveable sun roller element, which is opposite to the other sun roller element, wherein the second cam surface is formed at a plurality of places along the circumferential direction on an end surface of a cam ring, which is disposed to face the outer end surface of the moveable sun roller element via the holding device and configured to rotate together with the input shaft, in correspondence to the first cam surfaces, and wherein the holding device has a plurality of pockets configured to hold a plurality of the rolling elements, respectively.

Effects of the Invention

According to the present invention, it is possible to configure the loading cam mechanism as a structure having an excellent dynamic balance so that the power transmission efficiency is not lowered upon high-speed rotation.

DETAILED DESCRIPTION OF EMBODIMENTS

Hereinafter, embodiments of the present invention will be described in detail with reference to the drawings.

First Configuration Example

Figure 1:
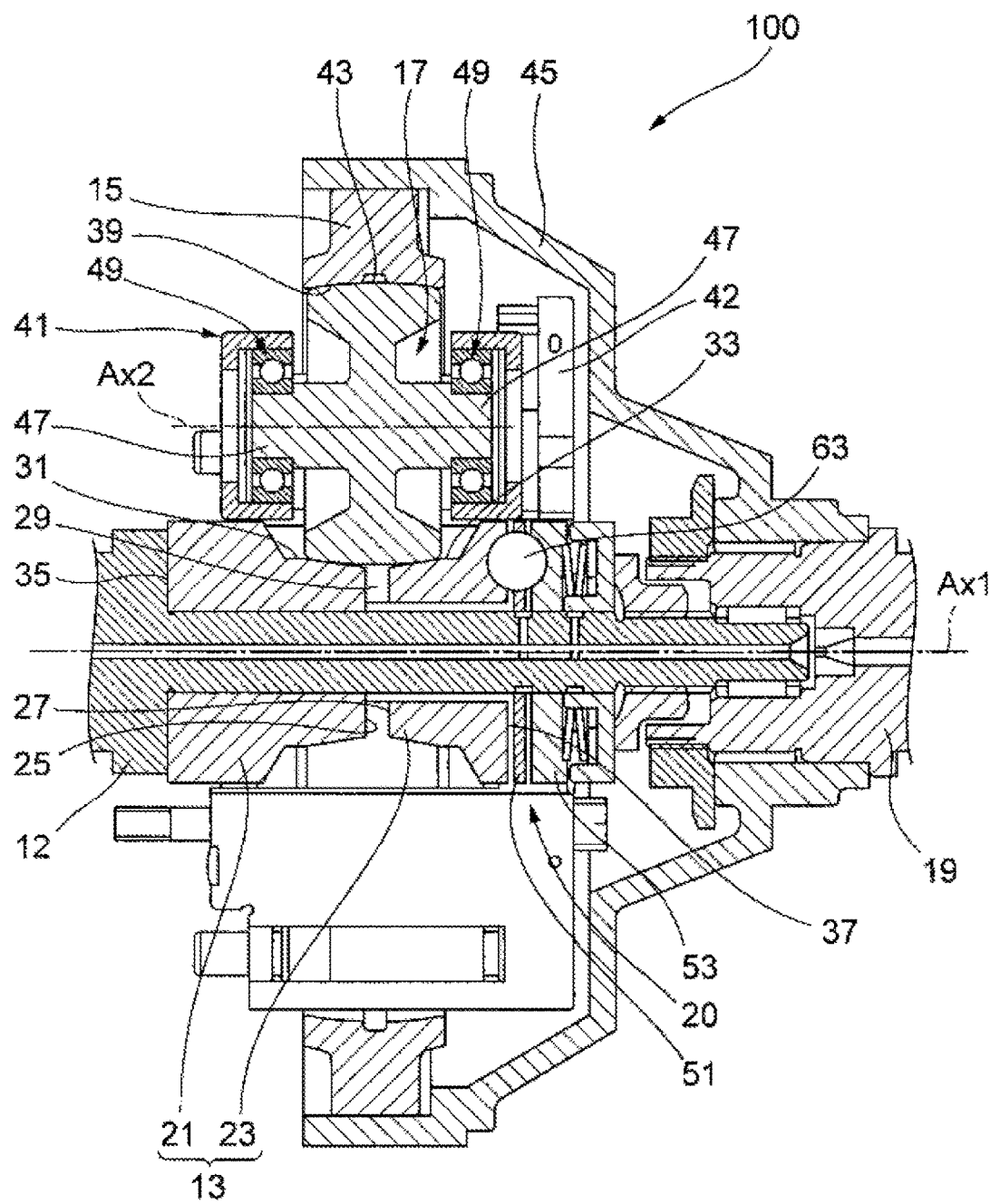
FIG. 1 is a sectional view of a friction roller-type transmission, illustrating an embodiment of the present invention.

FIG. 1 is a sectional view of a friction roller-type transmission, illustrating an embodiment of the present invention.

A friction roller-type transmission 100 has an input shaft (sun shaft) 12, a sun roller 13, an annular roller 15, a plurality of intermediate rollers 17, an output shaft 19 connected to the annular roller 15 and a loading cam mechanism 20. The friction roller-type transmission 100 is configured to rotate the sun roller 13 by the input shaft 12 coupled to a driving shaft of an electric motor (not shown) or the like, to transmit the rotation of the sun roller 13 to the annular roller 15 via the plurality of intermediate rollers 17 and to extract the same to the output shaft 19. The input shaft 12 and the output shaft 19 are supported on the same axis Ax1 by bearings (not shown).

The sun roller 13 has a pair of sun roller elements 21, 23 divided along a direction (hereinafter, referred to as axial direction) along the axis Ax1 of the input shaft 12. The pair of sun roller elements 21, 23 is concentrically disposed with a gap 29 being provided between facing end surfaces 25, 27 facing each other in the axial direction. Also, the sun roller element 23 is a moveable sun roller element disposed to be freely moveable in the axial direction so that it can rotate relative to the input shaft 12.

A part of an outer peripheral surface 31 of the sun roller element 21 is provided with an inclined surface of which an outer diameter increases from the facing end surface 25 toward an outer end surface 35, which is opposite to the facing end surface 25. Also, a part of an outer peripheral surface 33 of the sun roller element 23 is provided with an inclined surface of which an outer diameter increases from the facing end surface 27 toward an outer end surface 37, which is opposite to the facing end surface 27. Both the inclined surfaces are rolling contact surfaces with the intermediate rollers 17.

The annular roller 15 is a circular ring-shaped roller disposed on an outer periphery-side of the sun roller 13 concentrically with the input shaft 12 and the sun roller 13. An inner peripheral surface 39 of the annular roller 15 has an inclined surface inclined in a direction in which an inner diameter thereof increases toward an axially central portion, and the inclined surface is a rolling contact surface with the intermediate rollers 17. The annular roller 15 is supported to a coupling bracket 45 having one axial inner peripheral surface connected to the output shaft 19 with being freely movable in the axial direction and fixed in a rotation direction. The annular roller 15 is configured to rotate integrally with the output shaft 19.

The intermediate rollers 17 are disposed at a plurality of places along the circumferential direction in an annular space between the outer peripheral surfaces 31, 33 of the sun roller 13 and the inner peripheral surface 39 of the annular roller 15. Each of the intermediate rollers 17 is supported to an intermediate roller holder 41 so that it can rotate about an axis of rotation Ax2 parallel with the input shaft 12. The intermediate roller holder 41 is configured to rotatably support axial end portions 47, 47 of each intermediate roller 17 by radial bearings 49, 49. Outer peripheral surfaces 43 of the intermediate rollers 17 are respectively a convex curved surface of which a bus line shape is arc-like, and are respectively configured to rolling-contact the outer peripheral surfaces 31, 33 of the sun roller 13 and the inner peripheral surface 39 of the annular roller 15.

Figure 2:
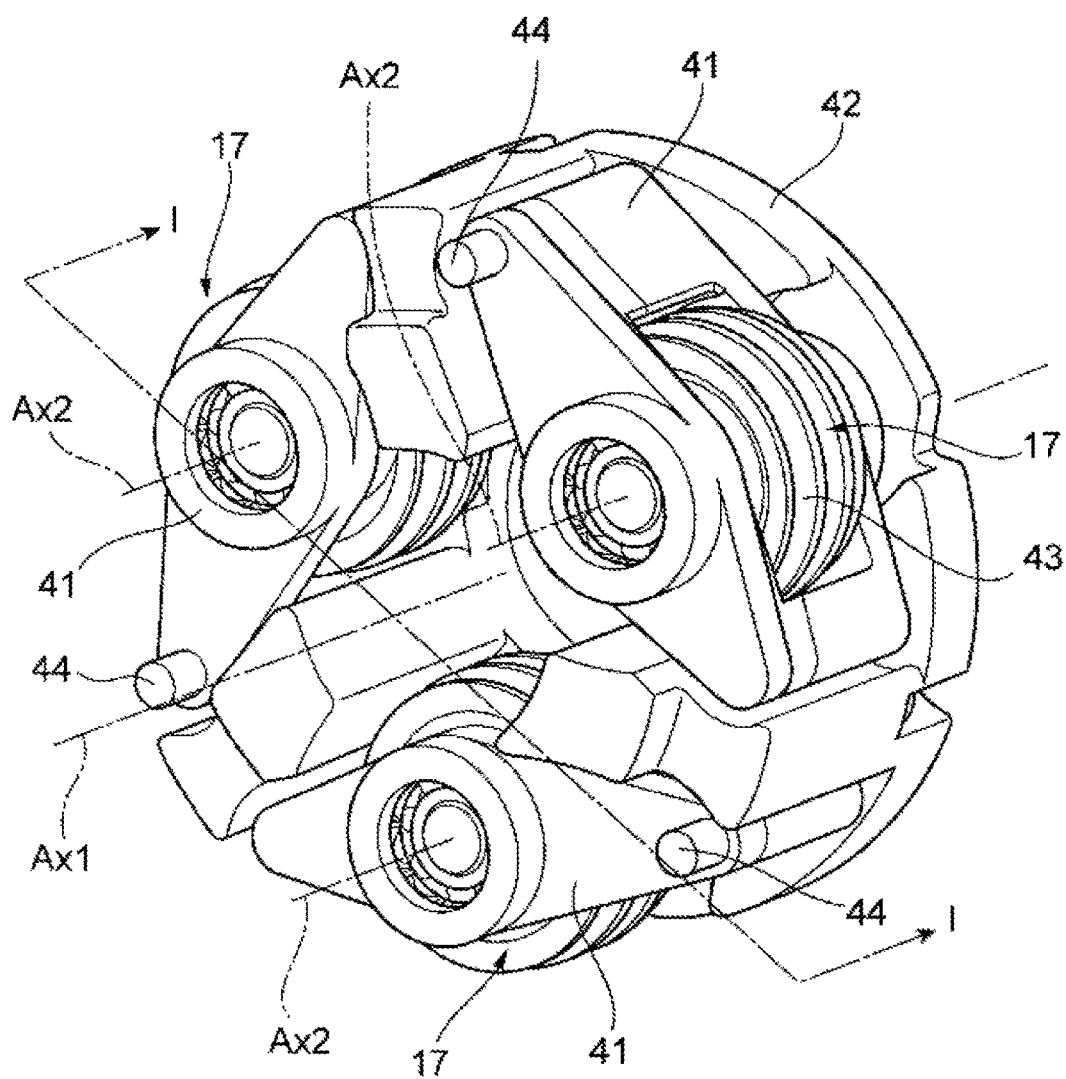
FIG. 2 is a perspective view of intermediate rollers supported to intermediate roller holders and a carrier.

FIG. 2 is a perspective view of the intermediate rollers 17 supported to the intermediate roller holders 41 and a carrier 42. The sectional view of FIG. 1 depicts a section taken along a line I-I of FIG. 2. The plurality of (three, in this configuration example) intermediate rollers 17 is disposed at equal intervals in the circumferential direction about the central axis Ax1 of the input shaft 12, and is supported to the intermediate roller holders 41 with each outer peripheral surface 43 being exposed to the outer periphery-side of the central axis Ax1. The intermediate roller holder 41 is supported to the carrier 42 so that it can freely pivot radially outward about a pivot shaft 44 and can freely move in the axial direction along the pivot shaft 44. The carrier 42 is fixed to a housing (not shown) becoming a fixing-side.

Thereby, the intermediate roller 17 is prevented from revolving around the input shaft 12, and is supported so that it can freely oscillate toward the radially outer side of the central axis Ax1 and can freely move in the axial direction.

As the transmission torque of the input shaft 12 shown in FIG. 1 increases, the loading cam mechanism 20 axially presses the sun roller element 23 toward the sun roller element 21.

Figure 3:
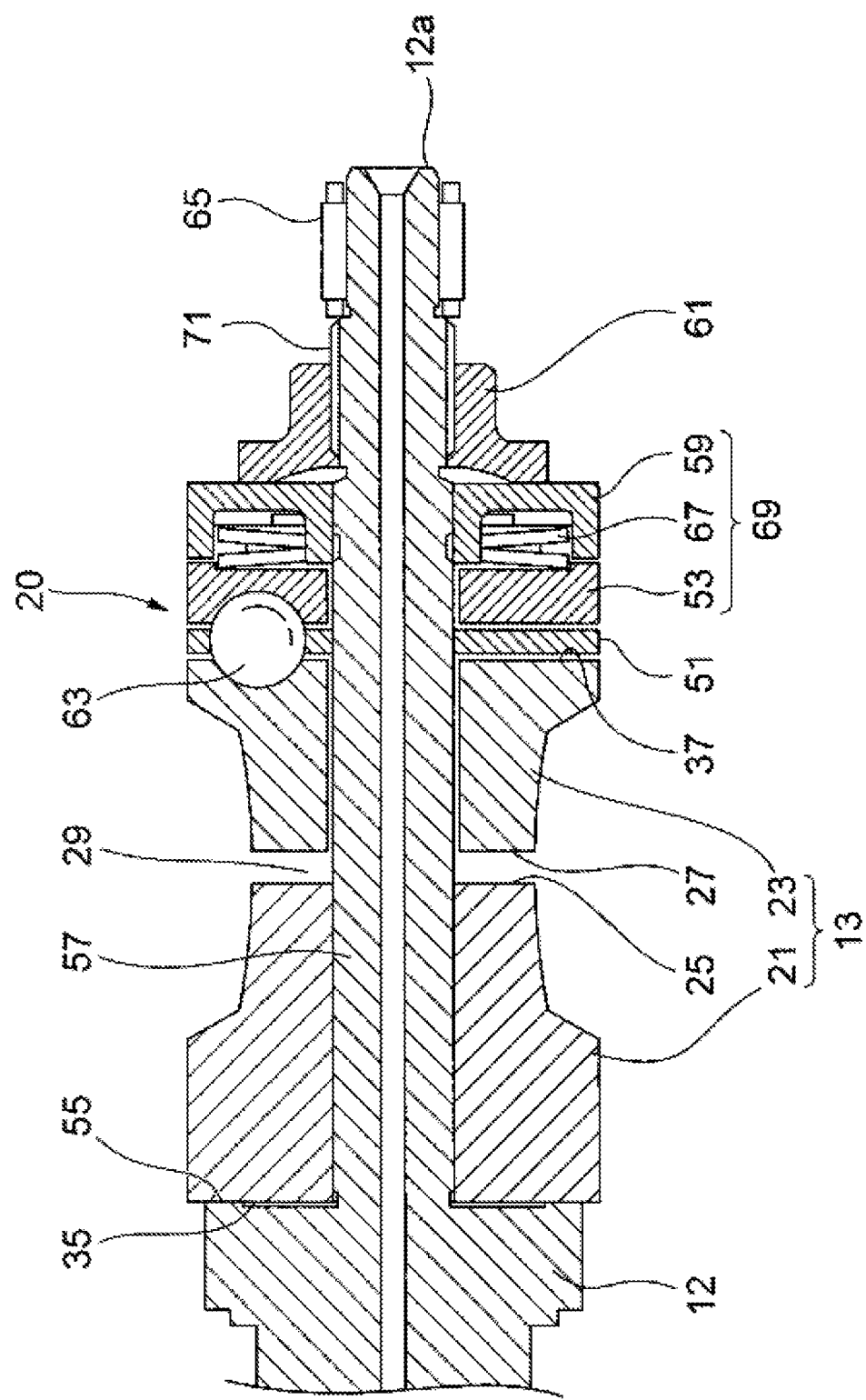
FIG. 3 is a partially sectional view including an input shaft and respective members fitted over the input shaft, which are shown in FIG. 1.
Figure 4:
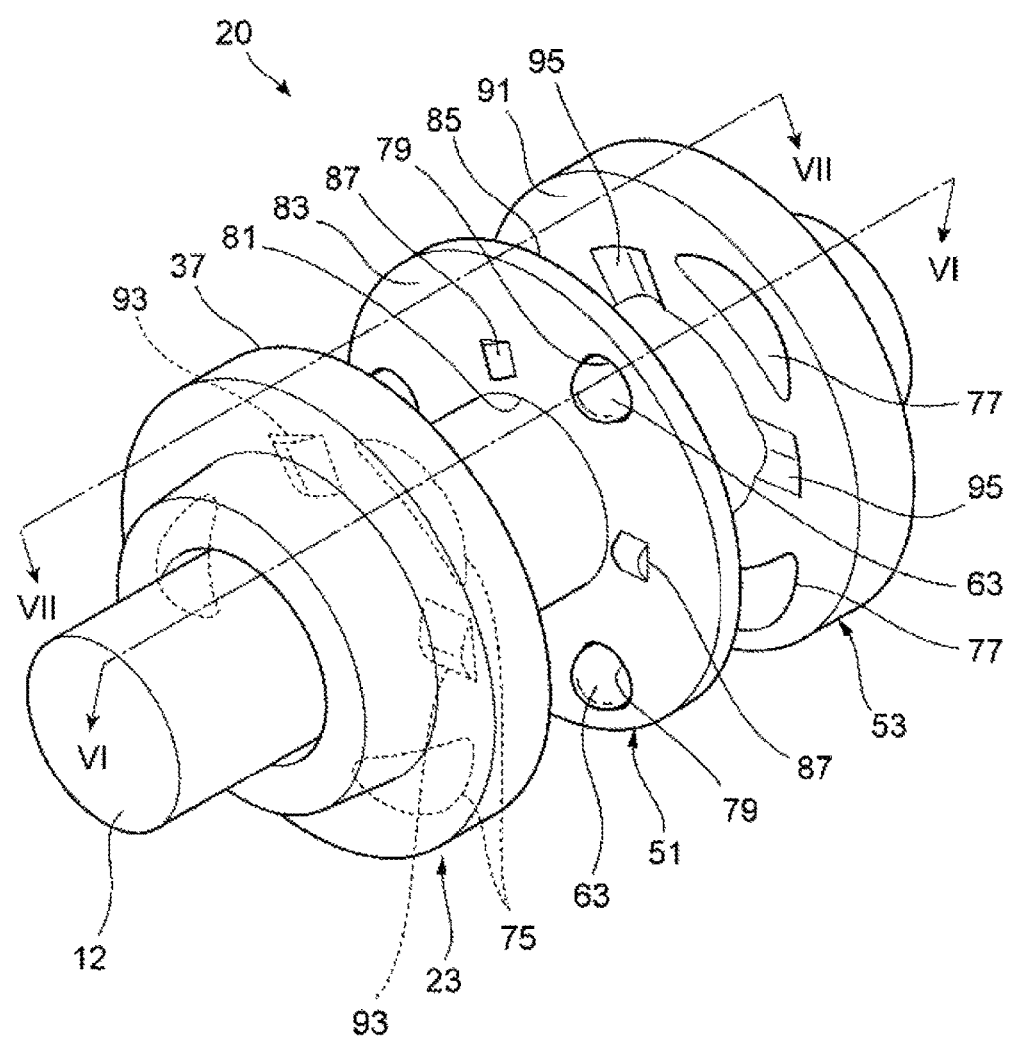
FIG. 4 is a partially exploded perspective view including the input shaft, a sun roller element, a holding device and a cam ring, which are shown in FIG. 3.

FIG. 3 is a partially sectional view including the input shaft 12 and respective members fitted over the input shaft 12, which are shown in FIG. 1. FIG. 4 is a partially exploded perspective view including the input shaft 12, the sun roller element 23, the holding device 51 and a cam ring 53, which are shown in FIG. 3. In below descriptions, a tip portion 12a-side of the input shaft 12 which is an output shaft 19-side is referred to as a tip-side (a right side in FIG. 3), and an opposite side of the input shaft 12 is referred to as a base end-side (a left side in FIG. 3).

As shown in FIGS. 3 and 4, the input shaft 12 has a stepped part 55 formed at the base end-side of the input shaft 12 and having a side facing toward the tip-side and a small-diameter shaft part 57 of which a diameter is smaller than an outer diameter of the stepped part 55 within a range from the stepped part 55 to the tip portion 12a of the input shaft 12.

The small-diameter shaft part 57 is mounted with the sun roller element 21 contacting the stepped part 55, the sun roller element 23, the holding device 51, the cam ring 53, a backup member 59 and a loading nut 61 in corresponding order. Also, an outer peripheral surface of the tip portion 12a of the small-diameter shaft part 57 is mounted with a needle bearing 65 configured to rolling-contact the output shaft 19 shown in FIG. 1.

The sun roller element 21 is configured to rotate integrally with the input shaft 12 by abutting with the stepped part 55. The sun roller element 23, the cam ring 53 and the backup member 59 are supported to the small-diameter shaft part 57 so that they can freely move in the axial direction.

The holding device 51 disposed between the sun roller element 23 and the cam ring 53 has a plurality of rolling elements (balls) 63. Also, an annular disc spring 67 configured to serve as a spring member is mounted between the cam ring 53 and the backup member 59. The disc spring 67 is configured to bias the cam ring 53 toward the base end-side, thereby preloading the sun roller element 23 from the backup member 59-side toward the base end-side. The cam ring 53, the backup member 59 and the disc spring 67 are collectively referred to as a loading part 69. The loading part 69 is configured to axially displace the sun roller element 23.

The small-diameter shaft part 57 is formed with a male screw portion 71 on an outer peripheral surface at a more tip-side than an axial region in which the sun roller 13 and the loading part 69 are disposed. The loading nut 61 is screwed to the male screw portion 71, so that the sun roller elements 21, 23 and the loading part 69 are retained to the small-diameter shaft part 57.

The backup member 59 and the cam ring 53 are formed with engaging claw portions consisting of axially protruding convex and concave portions on outer peripheral end surfaces facing each other. The convex and concave portions of the engaging claw portions are engaged with each other, so that the backup member 59 and the cam ring 53 integrally rotate at a state where they are prevented from rotating relative to each other and can be freely advanced and retreated in the axial direction. For this reason, the rotary torque from the input shaft 12 and the preloading force from the disc spring 67 are transmitted to the sun roller element 23 at the same time.

Subsequently, the configuration and basic operations of the loading cam mechanism 20 are described in detail.

As shown in FIG. 4, the loading cam mechanism 20 has first cam surfaces 75 of the sun roller element 23-side, second cam surfaces 77 of the cam ring 53-side, and balls 64 held one by one between the first cam surfaces 75 and the second cam surfaces 77.

The first cam surfaces 75 are provided at circumferentially equal intervals at a plurality of places (three, in this configuration example) on the outer end surface 37 of the sun roller element 23. The second cam surfaces 77 are formed on an end surface 91 of the cam ring 53 disposed to face the outer end surface 37 of the sun roller element 23 with the holding device 51 being interposed therebetween and are provided at a plurality of places (three, in this configuration example) corresponding to the first cam surfaces 75.

The first cam surface 75 and the second cam surface 77 have an axial depth that gradually changes in the circumferential direction, i.e., have a shape that is deepest at a central portion in the circumferential direction and becomes gradually shallow toward end portions (both end portions) in the circumferential direction of the cam surface, respectively.

The ball 63 is held in a pocket 79 of the holding device 51 and is rolling-contacted to the first cam surface 75 and the second cam surface 77.

In the loading cam mechanism 20 having the above configuration, at a state where the rotation of the input shaft 12 stops, each ball 63 is positioned at the deepest portions of the first cam surface 75 and the second cam surface 77 (a state shown in FIG. 14A). At this state, only preloading force that presses the sun roller element 23 toward the other sun roller element 21 is applied by an elastic force of the disc spring 67.

On the other hand, at a state where the input shaft 12 is rotated, the rotation driving force of the input shaft 12 is transmitted from the backup member 59 to the cam ring 53, so that the cam ring 53 is rotated together with the input shaft 12. Thereby, the balls 63 between the cam ring 53 and the sun roller element 23 are moved to the shallow portions of the first cam surfaces 75 and the second cam surfaces 77 (a state shown in FIG. 14B).

Then, the axial distance between the sun roller element 23 and the cam ring 53 increases, and the sun roller element 23 is axially pressed toward the sun roller element 21. As a result, the sun roller element 23 is pressed toward the sun roller element 21 of the axial base end-side by the elastic force generated from the disc spring 67 and the axial thrust resulting from the riding of the balls 63 on each of the cam surfaces 75, 77. Also, the sun roller element 23 is applied with the rotary torque from the cam ring 53 via the balls 63, and is thus rotated about the input shaft 12.

By the axial thrust generated by the loading cam mechanism 20, the axial distance between the sun roller element 21 and the sun roller element 23 decreases. Also, contact surface pressures of respective rolling raceway surfaces of the outer peripheral surfaces of the sun roller elements 21, 23, the outer peripheral surfaces of the intermediate rollers 17 and the inner peripheral surface of the annular roller 15 increase, so that the sliding is difficult to occur.

Therefore, as shown in FIG. 1, in the friction roller-type transmission 100 having the above configuration, when the input shaft 12 is rotated, the rotary torque of the input shaft 12 is transmitted from the sun roller 13 to each intermediate roller 17 and each intermediate roller 17 rotates about each axis of rotation Ax2 around the sun roller 13. Each intermediate roller 17 is supported to the carrier 42, which is a fixing-side, via the intermediate roller holder 41, and the rotation movement of each intermediate roller 17 is transmitted to the annular roller 15. The rotary torque transmitted to the annular roller 15 is transmitted to the output shaft 19 via the coupling bracket 45.

Each intermediate roller 17 and the annular roller 15 are axially moved and aligned in connection with the axial movement of the sun roller element 23.

Therefore, according to the friction roller-type transmission 100 having the above configuration, the contact surface pressure of each roller becomes appropriate depending on the magnitude of the rotary torque to be transmitted between the input shaft 12 and the output shaft 19, and the contact surface pressure smoothly increases in connection with the increase in the rotary torque. As a result, the excessive sliding does not occur at each roller part and the rolling resistance is prevented from increasing at the low-speed region, which is caused due to the excessive contact surface pressure of each roller part.

Subsequently, a configuration of the holding device 51 is described.

Figure 5:
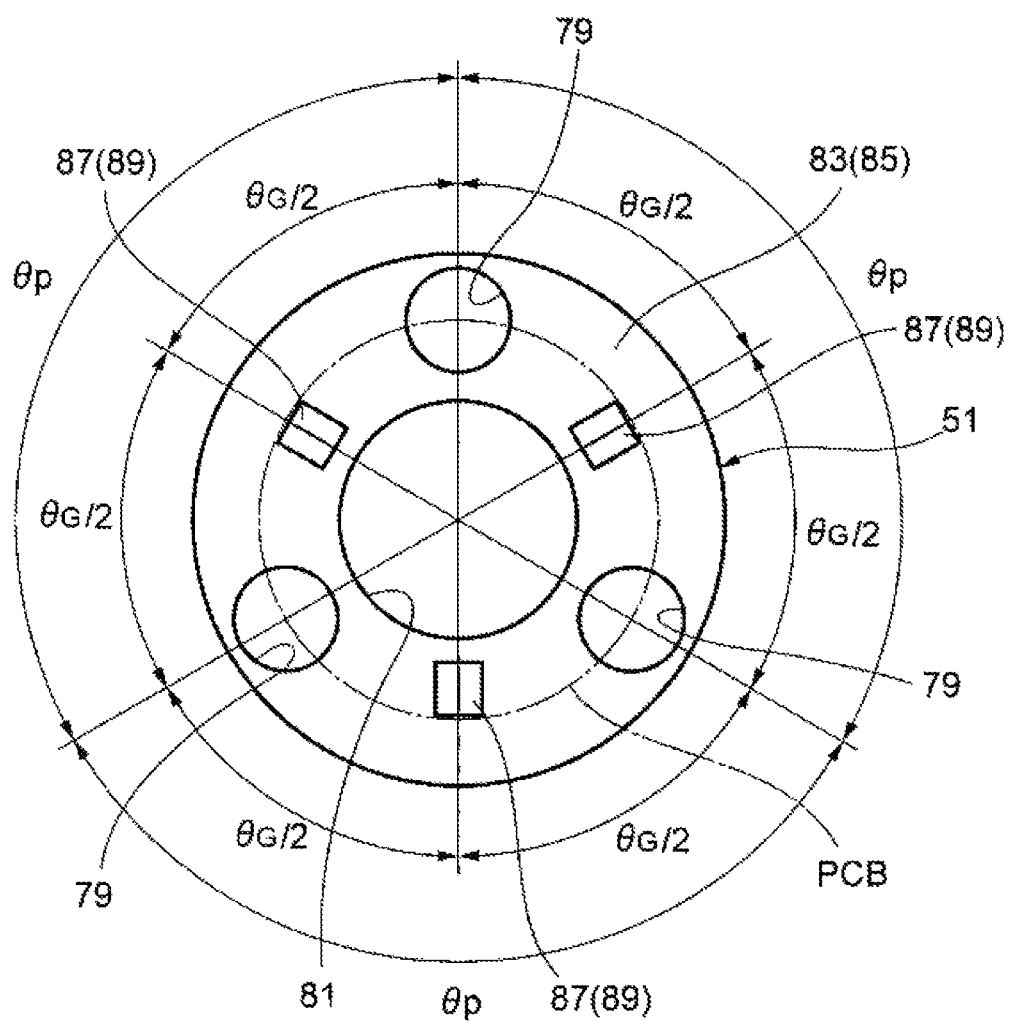
FIG. 5 is a plan view of the holding device.
Figure 6:
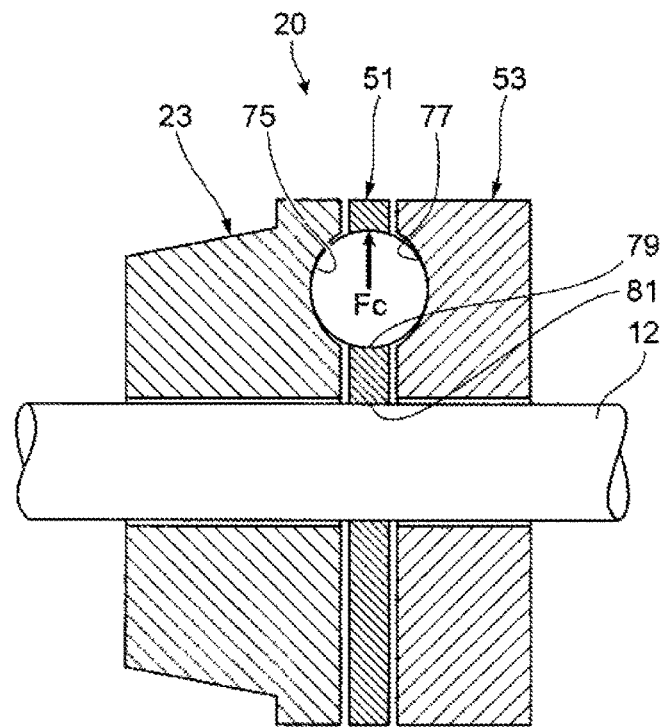
FIG. 6 is an assembled view of respective members on a section taken along a line VI-VI of FIG. 4.
Figure 7:
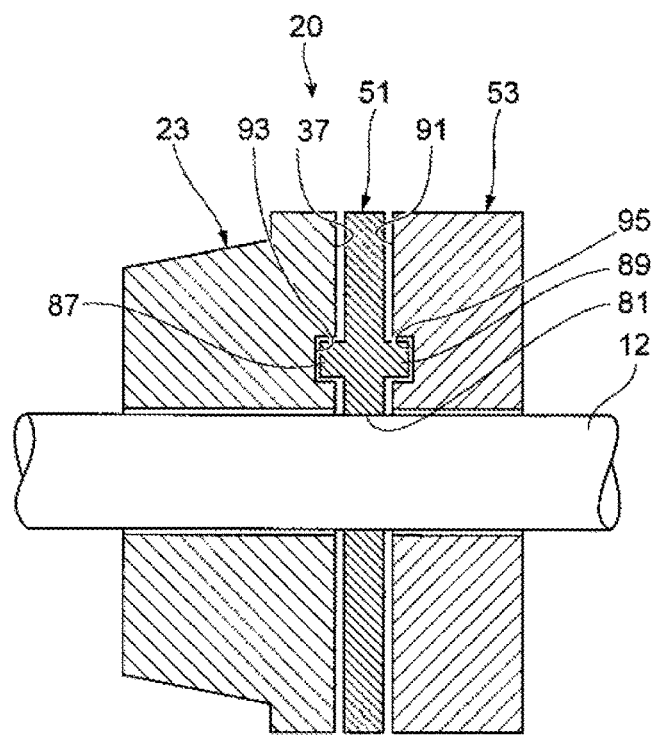
FIG. 7 is an assembled view of respective members on a section taken along a line VII-VII of FIG. 4.

FIG. 5 is a plan view of the holding device 51, FIG. 6 is an assembled view of respective members on a section taken along a line VI-VI of FIG. 4, and FIG. 7 is an assembled view of respective members on a section taken along a line VII-VII of FIG. 4.

As shown in FIGS. 5 to 7, the holding device 51 has a plurality of pockets 79 configured to accommodate therein the balls 63, an inner diameter surface guiding part 81 provided on an inner diameter surface, a plurality of guide protrusions 87 configured to serve as an end surface guiding part and provided on an end surface 83 facing the moveable sun roller element 23 shown in FIG. 4, and a plurality of guide protrusions 89 configured to serve as an end surface guiding part and provided on an end surface 85 facing the cam ring 53.

The guide protrusions 87, 89 of both the end surfaces 83, 85 of the holding device 51 are respectively formed to have the same protrusion height toward an axially outer side of the holding device 51. In this configuration example, as shown in FIGS. 5 and 7, the guide protrusions 87, 89 are provided in the same phase at three places at circumferentially equal intervals on each end surface.

As shown in FIG. 5, the pockets 79 are disposed at the same circumferential angle $\theta_P$ (120°) along the circumferential direction, and the guide protrusions 87, 89 are also disposed at the same circumferential angle $\theta_G$ (120°) along the circumferential direction. The guide protrusions 87, 89 are disposed with a phase shift of $\theta_G/2$ (60°) from the pockets 79, respectively.

That is, the guide protrusions 87, 89 are respectively disposed at an intermediate position between the pockets 79 adjacent to each other in the circumferential direction, and are disposed with a phase shift in the circumferential direction with respect to the pockets 79. Thereby, it is possible to make strength and rigidity of the holding device 51 uniform. Also, even when abrasion powders are generated upon the contact between the guide protrusions 87, 89 and the guide grooves 93, 95, the abrasion powders are not attached to the first and second cam surfaces 75, 77 and the ball surfaces. Therefore, there are no concerns that operation failures (lowering of the thrust and excessive increase of the thrust) of the cams due to biting, lowering of surface roughness, plastic deformation and the like are to be caused.

Also, as shown in FIGS. 4 and 7, guide grooves 93, which is configured to serve as an end surface guiding part for guiding the guide protrusions 87, is formed on the outer end surface 37 of the moveable sun roller element 23 at positions corresponding to the guide protrusions 87 of the holding device 51. Also, guide grooves 95, which is configured to serve as an end surface guiding part for guiding the guide protrusions 89, is formed on the end surface 91 of the cam ring 53 facing the holding device 51 at positions corresponding to the guide protrusions 89 of the holding device 51.

The input shaft 12 is fitted and inserted into the inner diameter surface guiding part 81, so that the holding device 51 is radially positioned. Thereby, the holding device 51 and the input shaft 12 are coaxially restricted. In the meantime, an axial thickness of the inner diameter surface guiding part 81 is 2 to 10%, preferably 3 to 5% of the diameter of the holding device 51. The greater the axial thickness of the inner diameter surface guiding part 81 is, the holding device 51 is more difficult to be inclined.

Also, the guide protrusions 87, 89 are respectively guided by the corresponding guide grooves 93, 95, so that it is possible to more securely prevent the inclination of the holding device 51. In this way, it is possible to secure the high vibration precision of the holding device 51 and to suppress the vibration and noise of the entire device.

Figure 8:
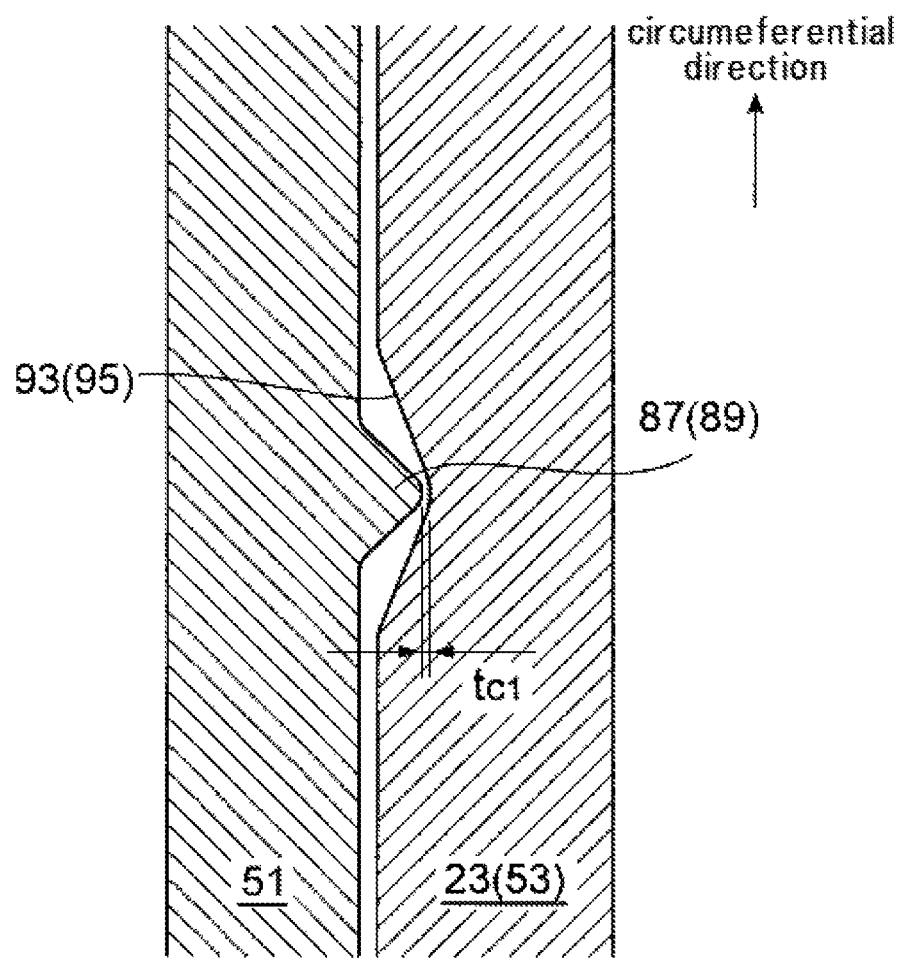
FIG. 8 is a sectional view of a guide protrusion and a guide groove taken along a circumferential direction.

FIG. 8 is a sectional view of the guide protrusions 87, 89 and the guide grooves 93, 95 taken along the circumferential direction. The guide protrusions 87, 89 are portions that are closest to the guide grooves 93, 95 and are to firstly contact the guide grooves when the holding device 51 is inclined. The state of FIG. 8 shows a state where no inclination occurs in the holding device 51. However, even when the elastic deformation occurs in the sun roller element 23, the cam ring 53 and the holding device 51 of FIG. 4, it is necessary to secure a clearance tc1 between the guide protrusions 87, 89 and the guide grooves 93, 95 by a predetermined amount.

If there is no clearance tc1 between the guide protrusions 87, 89 and the guide grooves 93, 95, the power transmission between the sun roller element 23 and the cam ring 53 is made through the guide protrusions 87, 89 formed at the holding device 51, too. In this case, it is not possible to apply the necessary pressing force to the balls 63. Also, if the power transmission is made through the guide protrusions 87, 89, since the holding device 51 and the guide grooves 93, 95 are contacted all the time, the friction loss resulting from the sliding movement increases and the pressing force of the first and second cam surfaces 75, 77 decreases. As a result, the rolling contact surfaces of the sun roller 13, the annular roller 15 and the intermediate rollers 17 are subjected to gross slip, so that seizing may be caused.

Regarding this, the guide grooves 93, 95 of this configuration example are configured to guide the guide protrusions 87, 89, which are to contact due to the inclination, to groove bottoms, thereby returning the holding device 51 to regular position and posture.

Figure 9:
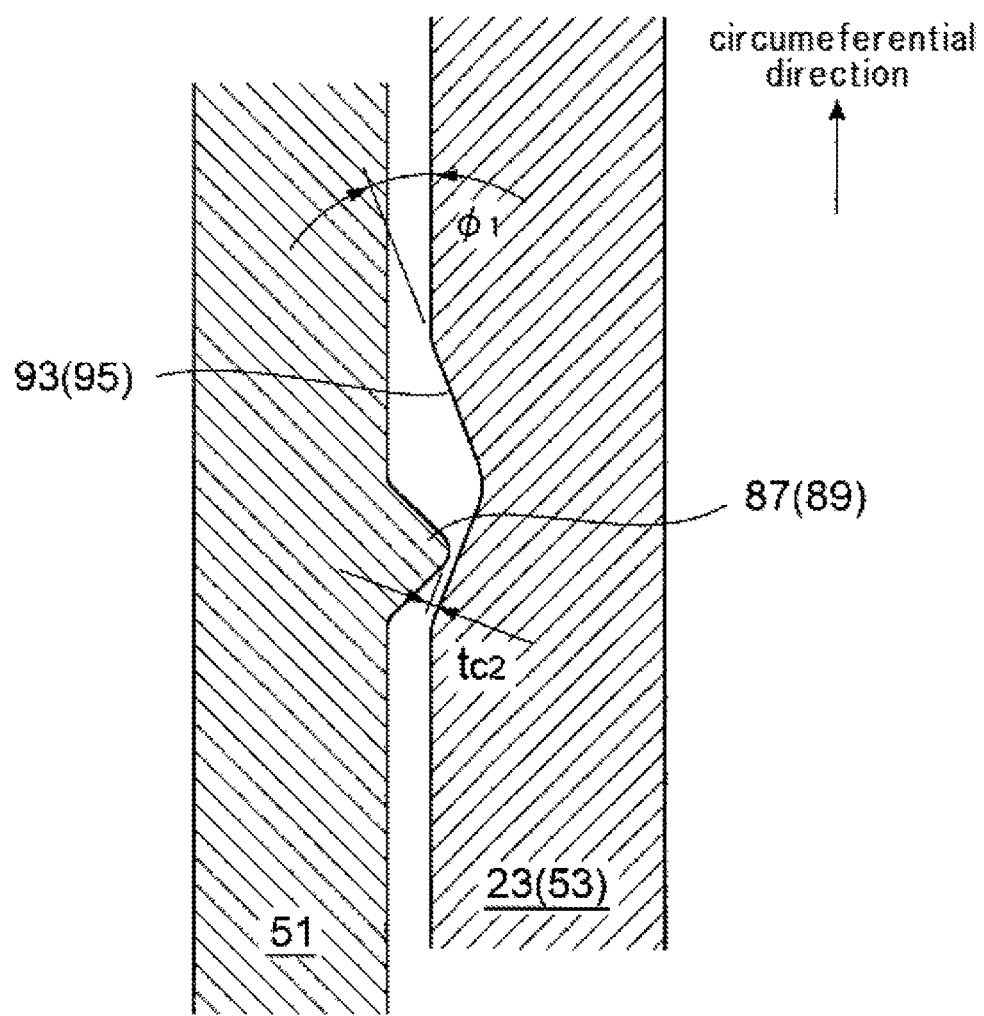
FIG. 9 is a sectional view of the guide protrusion and the guide groove taken along the circumferential direction at a state where rotary torque is applied between the sun roller and the cam ring.

FIG. 9 is a sectional view of the guide protrusions 87, 89 and the guide grooves 93, 95 taken along the circumferential direction at a state where the rotary torque is applied between the sun roller 13 and the cam ring 53. At this state, the distance between the sun roller element 23 and the cam ring 53 increases but apexes of the guide protrusions 87, 89 deviate from the groove bottoms of the guide grooves 93, 95.

The guide grooves 93, 95 are formed as inclined surfaces having an inclined angle $\phi_1$ in the circumferential direction so that they are not contacted to the guide protrusions 87, 89 even at the state where the apexes deviate from the groove bottoms. The inclined angle $\phi_1$ is preferably the same as the inclined angles of the first and second cam surfaces 75, 77 along the circumferential direction.

That is, the guide grooves 93, 95 have groove bottoms having the same inclined angles as the first and second cam surfaces 75, 77. In this case, even when the first and second cam surfaces 75, 77 come close to or separate from each other via the balls 63, the distance between the guide protrusions 87, 89 and the guide grooves 93, 95 changes by the substantially same distance as the axial movement amount, so that a clearance tc2 between the guide protrusions 87, 89 and the guide grooves 93, 95 is secured. Therefore, any interference between the guide protrusions 87, 89 and the guide grooves 93, 95 is prevented.

The inclined angle $\phi_1$ of the inclined surfaces of the guide grooves 93, 95 is expressed by a following equation (1).

$$\phi_1 = \tan^{-1}\{Lc/(2\pi r)\} \tag{1}$$

r indicates an arc radius [mm] of the guide grooves 93, 95, and cam lead Lc indicates an inclined angle corresponding to an axial movement amount [mm/360°] per one revolution of the first and second cam surfaces 75, 77.

Also, even upon any operation of the friction roller-type transmission, it is necessary to substantially match an axial central position of the holding device 51 and central positions of the balls 63 for correct movement of the cam ring 53. To this end, it is necessary to set a depth Dp of the guide groove 93 of the sun roller element 23 and the guide groove 95 of the cam ring 53 and a protrusion height H of the guide protrusions 87, 89 of the holding device 51 greater than a half of an axial relative movement amount Δd between the sun roller element 23 and the cam ring 53, which is design-expected upon an operation (Dp=H>Δd/2).

When the protrusion height H of the guide protrusions 87, 89 is less than the half of the axial relative movement amount Δd, the holding device 51 loses its guide function because the guide protrusions 87, 89 separate from the guide grooves 93, 95.

The elastic deformation amounts of the power transmission members such as the sun roller 13, the annular roller 15, the intermediate roller 17 and the like change in accordance with the increase or decrease of the rotary torque. The sun roller element 23 is configured to slightly move in the rotation direction and the axial direction with respect to the input shaft 12 so as to follow the respective elastic deformation amounts. At this time, the holding device 51 and the balls 63 are moved by a half of the axial relative movement amount of the sun roller element 23. For this reason, regarding the protrusion height H of the guide protrusions 87, 89 of the holding device 51, a height of at least a half or greater of the relative movement amount is required.

According to the friction roller-type transmission 100 having the above configuration, the balls 63 are held at the holding device 51. Thereby, it is possible to enable the thrust, which is generated due to the centrifugal force to be applied to the balls 63 upon the high-speed rotation, not to be axially applied to the sun roller element 23 and the cam ring 53. Also, since the axial position of the holding device 51 is restricted and the inclination thereof is prevented by the guide protrusions 87, 89 of the holding device 51 and the guide grooves 93, 95 of the sun roller element 23 and the cam ring 53, the dynamic balance upon the rotation is appropriately held with precision.

Also, since the holding device 51 is configured to adjust the shaft center position by the inner diameter surface guiding part 81, irrespective of the balls 63, it is easy to secure the vibration precision upon the rotation. Thereby, the remaining unbalance amount is lowered at the assembled state, so that it is possible to reduce the vibrations and noises and to secure the high quietness. Further, according to this configuration, it is not necessary to newly prepare a jig for dynamic balance correction and to assemble the balls 63, the sun roller element 23 and the cam ring 53 for holding the holding device, so that it is possible to save the cost.

Second Configuration Example

Subsequently, a second configuration example of the friction roller-type transmission is described.

Figure 10:
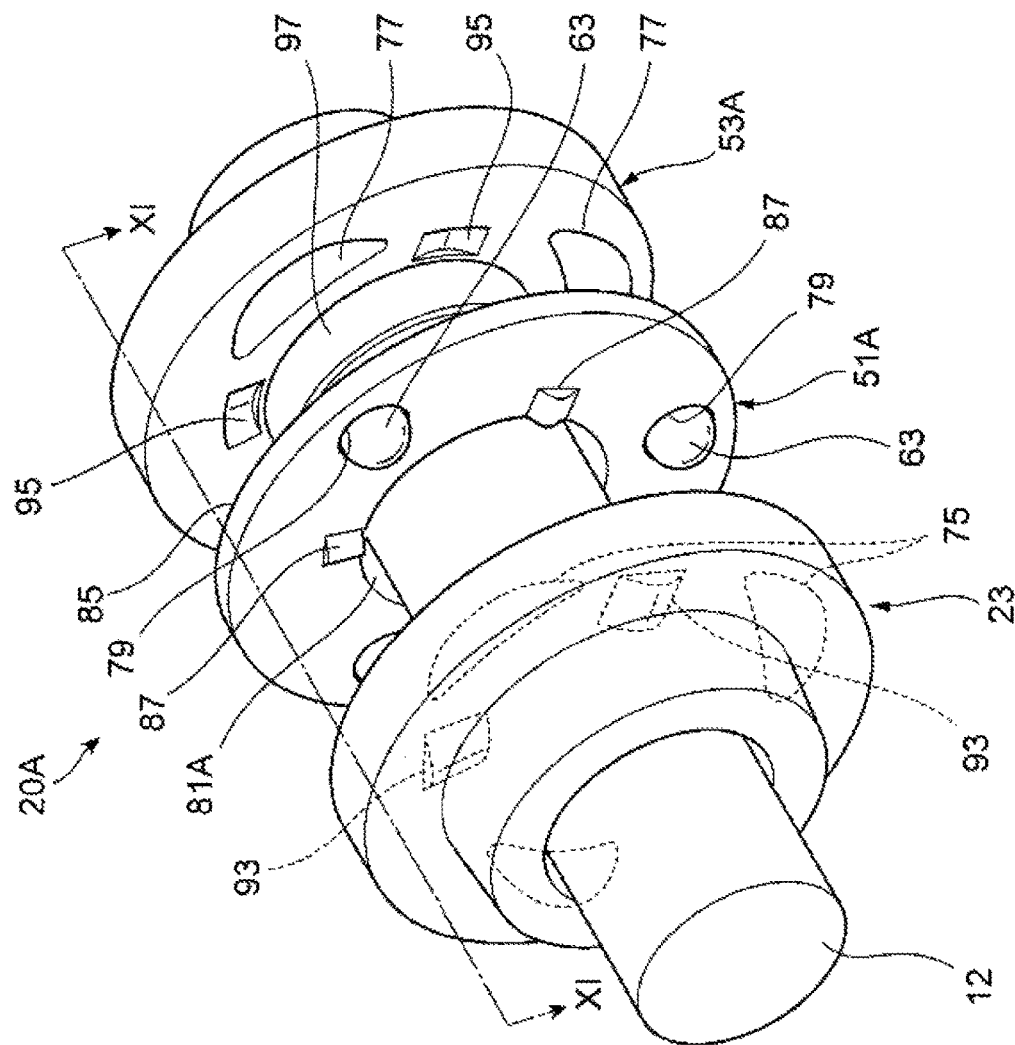
FIG. 10 is a partially exploded perspective view including the input shaft, the sun roller element, a holding device and a cam ring of a second configuration example.
Figure 11:
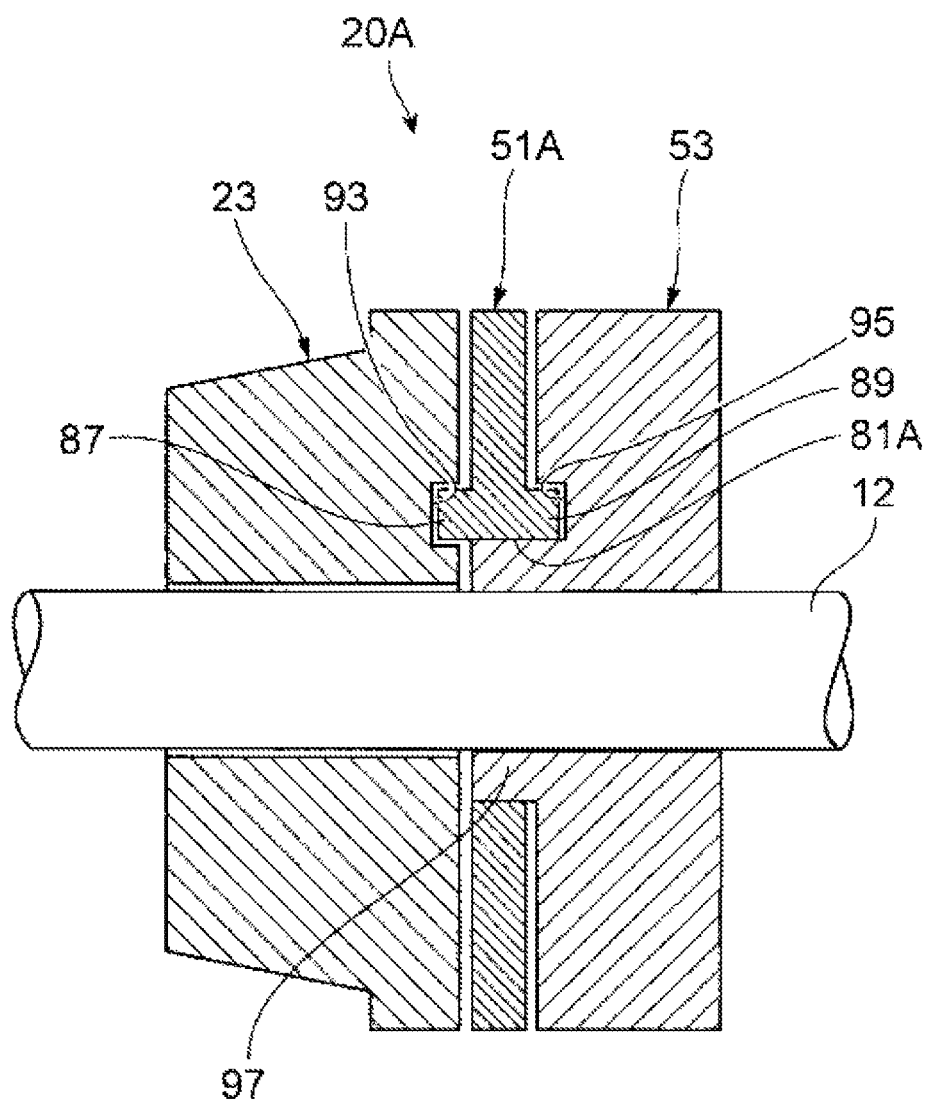
FIG. 11 is an assembled view on a section taken along a line XI-XI of FIG. 10.

FIG. 10 is a partially exploded perspective view including the input shaft 12, the sun roller element 23, a holding device 51A and a cam ring 53A of the second configuration example, and FIG. 11 is an assembled view on a section taken along a line XI-XI of FIG. 10. A loading cam mechanism 20A of the second configuration example is the same as the first configuration example, except that a boss part 97 of the cam ring 53A is inserted to an inner diameter surface guiding part 81A of the holding device 51A. In below descriptions, the same members are denoted with the same reference numerals and the descriptions thereof are simplified or omitted.

The cam ring 53A has a circular ring-shaped boss part 97 axially extending on an inner periphery-side. The holding device 51A has an inner diameter surface guiding part 81A to which the boss part 97 is to be fitted and inserted. The boss part 97 is inserted to the inner diameter surface guiding part 81A, so that a shaft center position of the holding device 51A with respect to the input shaft 12 is adjusted with higher precision. The other operational effects are the same as the first configuration example.

The guide protrusions 87, 89, and the guide grooves 93, 95 of the respective configuration examples are formed at the more inner sides than the pitch circle diameter P.C.D. (refer to FIG. 5) of the ball 63 but may be formed at an more outer side than the pitch circle diameter P.C.D. or may be formed on a line of the pitch circle diameter P.C.D.

Also, the ball 63 is generally formed of a high carbon chrome bearing steel material such as SUJ2 defined in JIS G 4805, an iron-based metal material such as stainless steel, or the like, in many cases. Therefore, when the ball 63 is formed of a ceramic material including silicon nitride $Si_3N_4$, silicon carbide SiC, alumina. $Al_2O_3$, and zirconia $ZrO_2$, the specific weight is reduced and the thrust Ft (refer to FIG. 16) by the centrifugal force can be lowered, as compared to Fe-based material (while the specific weight of Fe-based material is about 7.8, the specific weight of silicon nitride is 3.2, the specific weight of silicon carbide is 3.2, the specific weight of alumina is 3.9, and the specific weight of zirconia is about 6.0).

The guide protrusions 87, 89 provided for the holding devices 51, 51A may fixed by a means, which is not to be separated even upon the operation, for example by pressing or welding a protrusion member such as a pin, in other words, may be separately formed from the holding device main body.

Further, the holding device and the members (the rotary shaft such as the input shaft 12 and the cam rings 53, 53A) configured to guide the holding device are preferably formed of different materials from a standpoint of securing slidability.

Also, at least one of the holding device and the members configured to guide the holding device may be surface-treated so as to secure the slidability. Examples of the surface treatment may include application of solid lubricant for seizure, PVD, CVD, nitriding treatment, carburization quenching, carbonitriding, formation of a DLC (Diamond-Like Carbon) film and the like. In particular, a treatment of increasing hardness beyond a matrix is preferable from a standpoint of securing durability of the sliding part.

Third Configuration Example

Subsequently, a third configuration example of the friction roller-type transmission is described.

Figure 12:
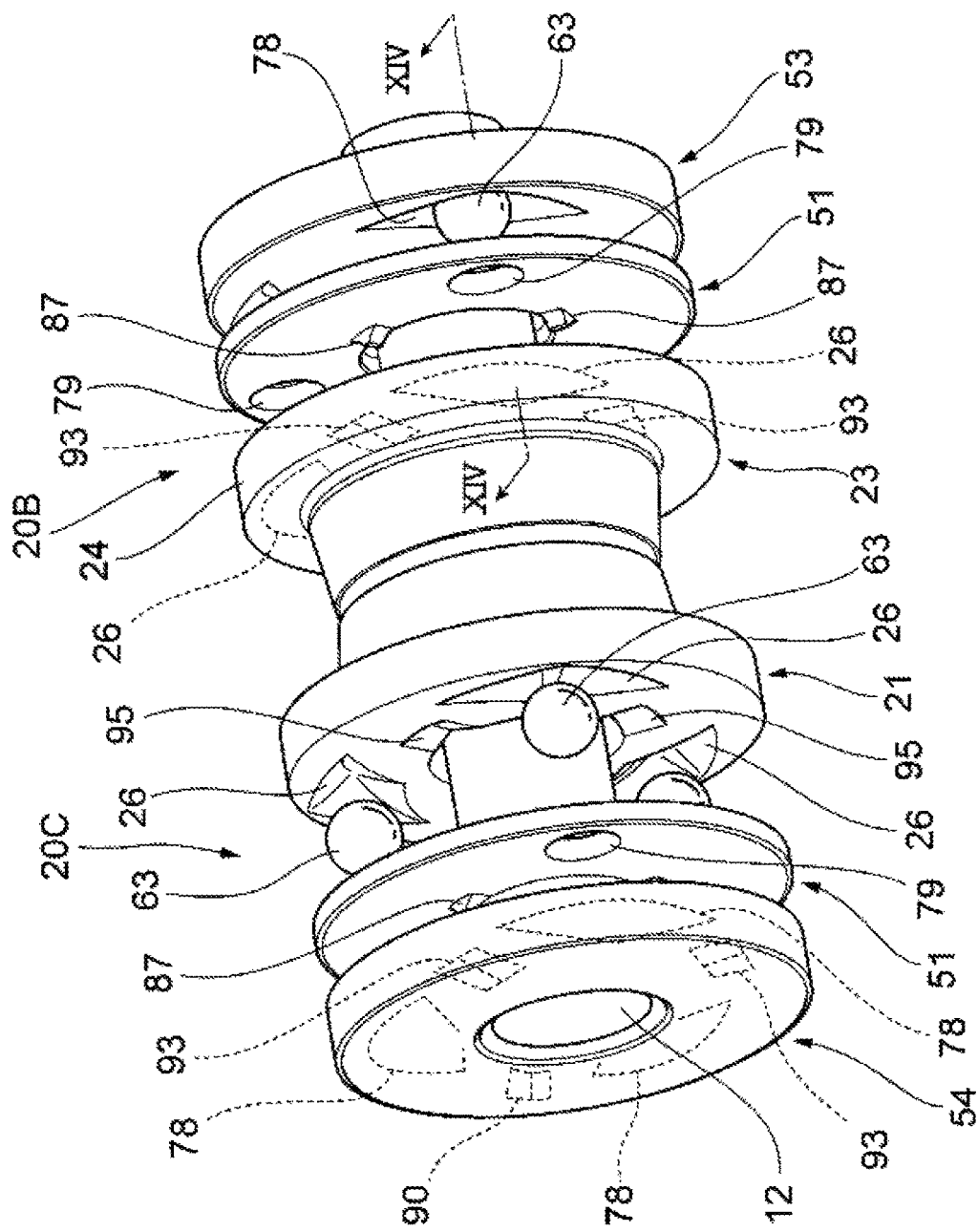
FIG. 12 is a perspective view of main parts, showing a third configuration example of the friction roller-type transmission.

FIG. 12 is a perspective view of main parts, showing a third configuration example of the friction roller-type transmission. The friction roller-type decelerator of the third configuration example also has a structure capable of suppressing the gross slip, securing the durability and improving the transmission efficiency by adjusting the traction coefficient μ of each traction part in correspondence to the circumferential speed V of each traction part.

In this case, the traction coefficient μ is adjusted so that the higher the circumferential speed V of the traction part is, the normal force to be applied to the traction surface becomes greater. The structures and operations of the other parts are the same as the above-described configuration. Therefore, the features of the third configuration example are mainly described.

In the friction roller-type decelerator of the third configuration example, a pair of loading cam mechanisms 20B, 20C is mounted at positions at which the pair of sun roller elements 21, 23 configuring the sun roller 13 is sandwiched from both axial sides. The structures of the pair of loading cam mechanisms 20B, 20C are the same except for the parts irrelevant to the gist of the present invention, for example, except that parts configured to apply the preload to each of the sun roller elements 21, 23 are symmetric. For this reason, in the below, only one (right, in FIG. 12) loading cam mechanism 20B of the pair of loading cam mechanisms 20B, 20C is described.

The loading cam mechanism 20B has the sun roller element 23, the cam ring 53, the plurality of balls 63, and the holding device 51 configured to hold the balls 63. The sun roller element 23 is supported to an intermediate part of the input shaft 12 so that it is concentric with the input shaft 12 and can be relatively rotated and axially displaced with respect to the input shaft 12.

As described above, the holding device 51 has the plurality of pockets 79 configured to accommodate therein the balls 63 and the plurality of guide protrusions 87 (also the guide protrusions 89 (not shown)) formed on both end surfaces. The arrangement positions of the pockets 79 and the guide protrusions 87, 89 are the same as the arrangement positions shown in FIGS. 4 and 10.

Figure 13:
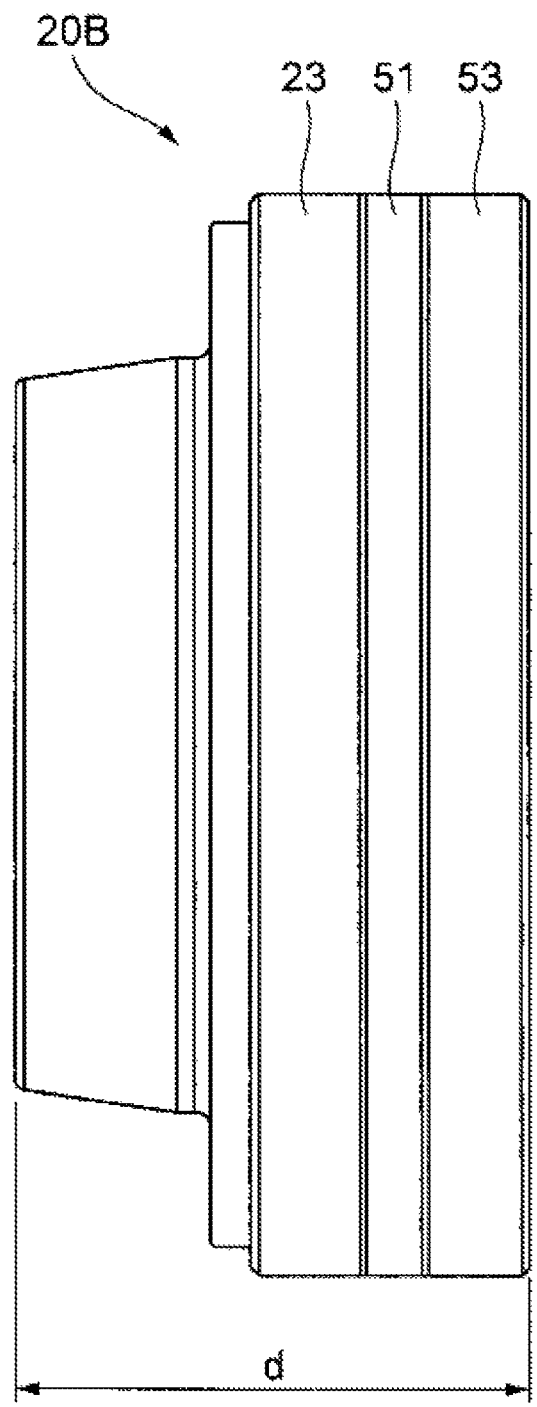
FIG. 13 is a side view depicting an assembled state of a loading cam mechanism shown in FIG. 12.

FIG. 13 is a side view depicting an assembled state of the loading cam mechanism 20B shown in FIG. 12. An axial thickness d of the loading cam mechanism 20B is smallest at a state where the rotation of the input shaft stops, and increases depending on the riding positions of the ball 63 on the cam surfaces 78, 26 when the input shaft is rotated.

Subsequently, the cam surfaces 78, 26 of the third configuration example are described.

An outer peripheral surface of a base end portion of the sun roller element 23 is provided with a collar part 24 having an outward flange shape. Driven-side cam surfaces 26 denoted with the dotted line in FIG. 12 are provided at a plurality of places in the circumferential direction of a base end surface of the sun roller element 23 including the collar part 24. Also, an end surface of the cam ring 53 facing the driven-side cam surfaces 26 is formed with driving-side cam surfaces 78.

An outer peripheral surface of the tip portion of the sun roller element 23, which is configured to rolling-contact the outer peripheral surfaces of the intermediate rollers 17 (refer to FIG. 1), is an inclined surface inclined in a direction in which an outer diameter thereof decreases toward a tip surface and having a partially conical convex surface shape.

In the friction roller-type decelerator configured as described above, when the decelerator is activated and the torque is input to the input shaft 12, the loading cam mechanism 20B generates the axial force in accordance with the circumferential cam angles of the cam surfaces 78, 26, based on the engagement between each ball 63 and each of the cam surfaces 78, 26.

Figure 14:
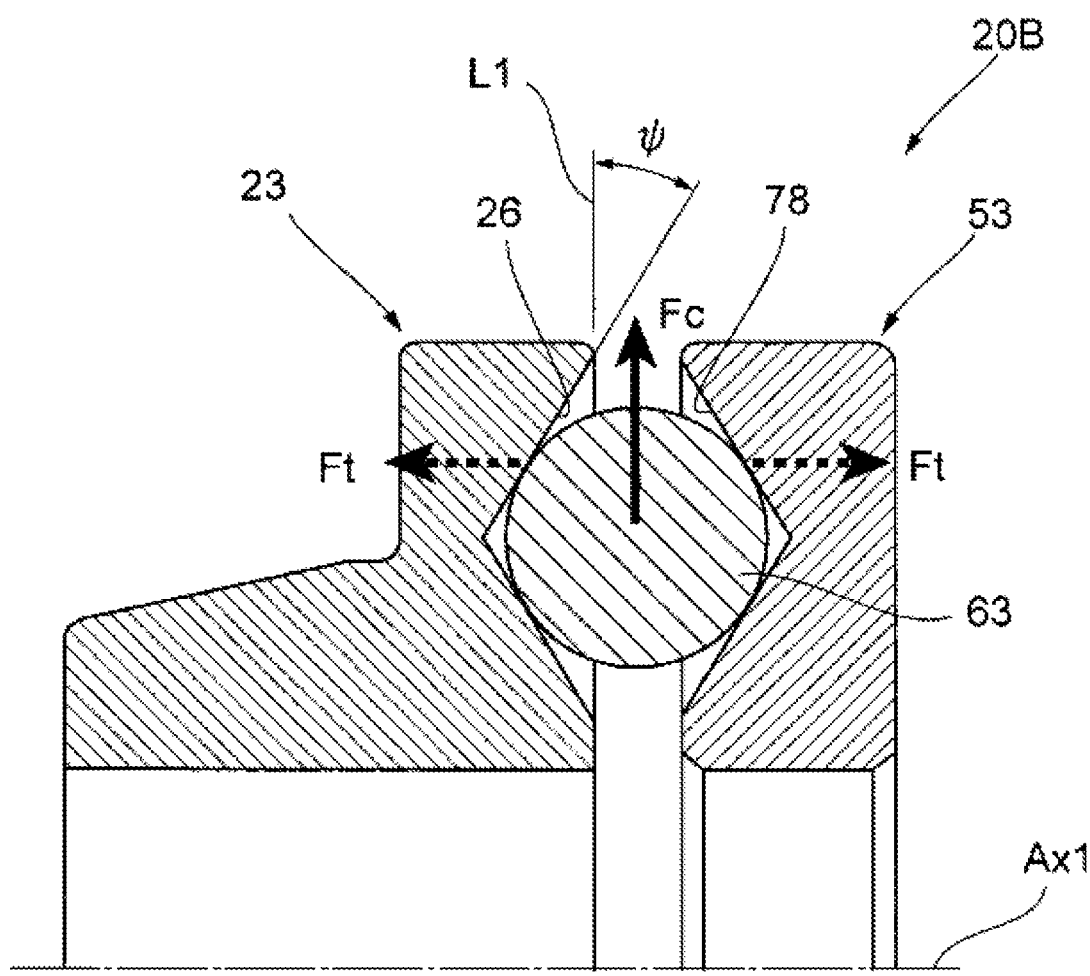
FIG. 14 is a partially sectional view of a section taken along a line XIV-XIV of FIG. 12.

FIG. 14 is a partially sectional view of a section taken along a line XIV-XIV of FIG. 12. In FIG. 14, the holding device is not shown for simple descriptions. As shown in FIG. 14, during the operation of the decelerator, the centrifugal force Fc is applied to the ball 63 in accordance with the rotating speed of the input shaft. The centrifugal force Fc is converted into the axial force Ft, in correspondence to a cam angle ψ between the cam surface 26 on which the ball 63 abuts (which is also the same for the cam surface 78) and a perpendicular line L1 of the axis Ax1.

The radial sections of the cam surfaces 78, 26 shown in FIG. 14 have a shape that gradually changes from the deepest portions of the cam surfaces 78, 26 toward the outer diameter parts and becomes linearly shallow, respectively. The cam angle ψ of the cam surfaces 78, 26 is set to any constant angle. That is, the cam angle ψ of the cam surfaces 78, 26 is constant, irrespective of radial positions. For this reason, the contact angle between the ball 63 and the cam surfaces 78, 26 is always constant, irrespective of the operating states where conditions such as rotating speed and transmission torque are changed, rigidity of the member, a gap between the members and the like.

Therefore, according to the cam surfaces 78, 26 of the third configuration example, it is possible to estimate the increase in the axial force resulting from the rotation in planned and quantitative ways. During the high-speed rotation of the decelerator, a limit traction coefficient $\mu_{max}$, which is the traction coefficient of a limit capable of transmitting the power, is lowered. However, it is possible to make a design capable of suppressing the gross slip, in correspondence to the lowering.

Also, during the high-speed rotation of the decelerator, since it is not necessary to increase the design values of the pressing forces as a whole, which are to be generated by the cam surfaces 26, 78, in conformity to the lowering of the limit traction coefficient $\mu_{max}$, it is not necessary to set the traction coefficient μ to an excessively high value. For this reason, it is possible to improve the power transmission efficiency during the low-speed rotation, particularly and to improve the durability of the decelerator.

As shown in FIG. 14, when the cam angle of the cam surface 26 (also the cam surface 78) is denoted as w, an angular velocity of the loading mechanism is denoted as ω, a mounting radius of the ball 63 from the axis Ax1 is denoted as r and a mass of the ball is denoted as m, the centrifugal force Fc to be applied to the ball is expressed by a following equation (2).

$$Fc = mr\omega^2 \qquad (2)$$

The axial force Fa resulting from the centrifugal force Fc is expressed by a following equation (3).

$$Fa = Fc/\tan\psi \qquad (3)$$

According to the friction roller-type decelerator, the axial pressing force that is to be generated by the loading cam mechanism 20B is as follows. That is, based on the engagement between each ball 63 and each of the cam surfaces 26, 78, the pressing force is a summed force of a force based on an increase in the axial thickness d (refer to FIG. 13) of the loading cam mechanism 20B and the axial force Fa, which is to be converted by the cam angle ψ on the inclined surface in the outer diameter direction of the cam surfaces 26, 78, of the centrifugal force Fc that is to be generated at the ball 63 in correspondence to the number of revolutions of the input shaft.

The force based on the centrifugal force Fc becomes higher as the rotating speed of the sun roller element 23 increases. Therefore, the higher the circumferential speed V of the traction part is, the pressing force that is to be generated by the loading cam mechanism 20B increases.

Figure 15:
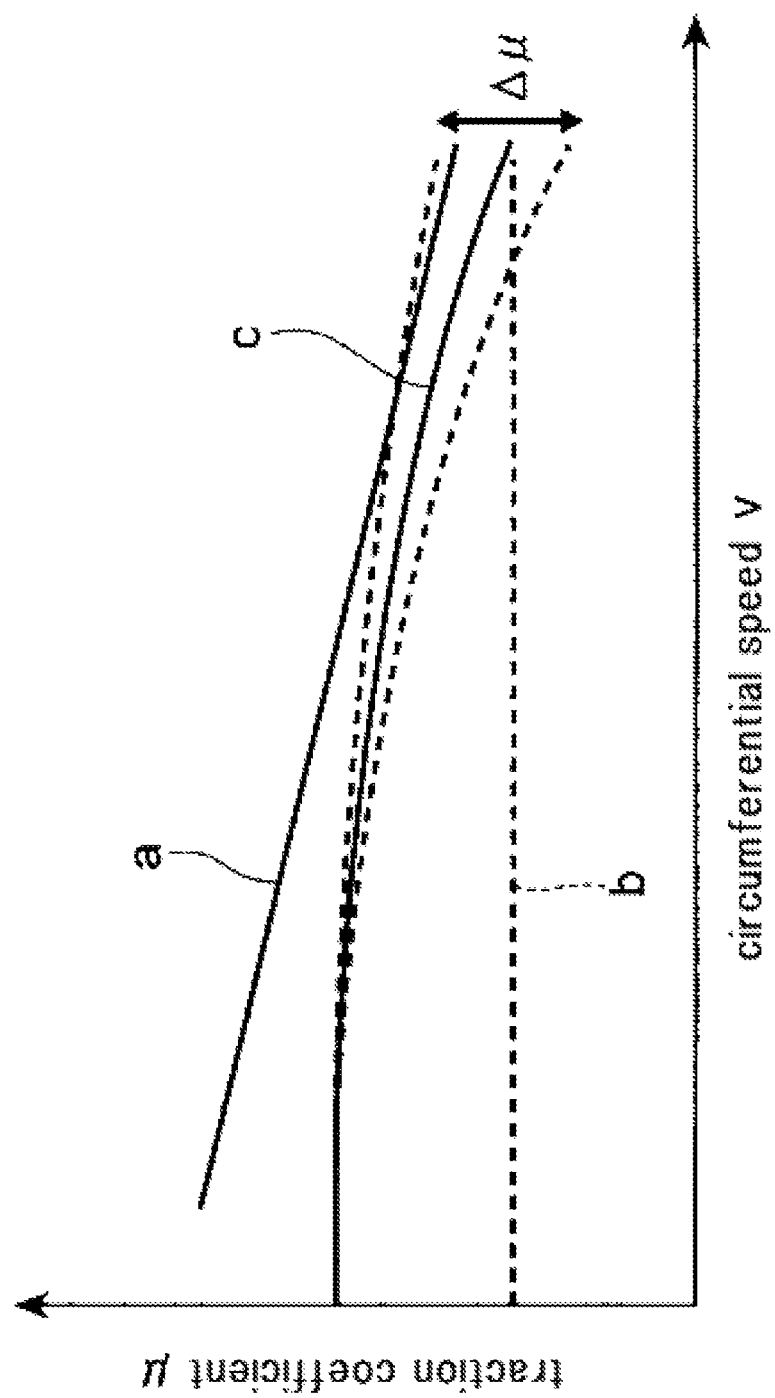
FIG. 15 is a graph depicting a relation between a traction coefficient μ and a circumferential speed v of a traction part.

FIG. 15 is a graph depicting a relation between the traction coefficient μ and the circumferential speed v of the traction part. In the graph, the solid line a indicates the limit traction coefficient $\mu_{max}$, which is the traction coefficient of the limit capable of transmitting the power, and the broken line b indicates the traction coefficient of the friction roller-type decelerator of the related art. As shown with the solid line c in the graph, the traction coefficient μ of each traction part of the friction roller-type decelerator of the third configuration example can be made small in the high-speed region. Also, as shown with a range of Δμ in FIG. 15, it is possible to increase or decrease a lowering level of the traction coefficient μ by changing the conditions.

As a result, the relation between the traction coefficient μ and the circumferential speed V of the traction part can be made closer to the relation denoted with the solid line a, as compared to the conventional structure. For this reason, when the circumferential speed V is slow, each traction part is suppressed from being excessively pressed, and when the circumferential speed V is high, the necessary pressing can be secured, so that it is possible to secure the durability and to improve the power transmission efficiency.

On the other hand, according to the friction roller-type decelerator of the related art, as shown with the broken line b, the traction coefficient μ of each traction part is constant, irrespective of the circumferential speed V. For this reason, in a case where the pressing force is appropriately set in conformity to the high circumferential speed V, when the circumferential speed V is slow, the pressing force of each traction part is excessively increased, so that the durability and the transmission efficiency may be lowered. In contrast, in a case where the pressing force is appropriately set in conformity to the low circumferential speed V, when the circumferential speed V is high, the gross slip is likely to occur at each traction part.

Subsequently, the holding device 51 of the third configuration example is described.

The holding device 51 has the same configuration as the holding device of the first configuration example, and is configured to receive the centrifugal force to be applied to the balls 63 configuring the loading cam mechanism 20B and to restrict the radial position of each ball 63 to an appropriate state. The holding device 51 is formed with the pockets 79 for holding each ball 63 to be freely rollable at equal intervals at a plurality of places (three places, in the shown example) in the circumferential direction.

Also, as described above, the guide protrusions 87 (also the guide protrusions 89 (not shown)) protruding toward the base end surface of the sun roller element 23 and one surface of the cam ring 53 are provided integrally with the holding device 51 at portions near the inside in the radial direction of the circumferentially intermediate parts between the adjacent pockets 79 of both axial side surfaces of the holding device 51, i.e., portions at which the phases with respect to the circumferential direction deviate from the respective pockets 79.

The axial height H of each of the guide protrusions 87, 89 is greater than a half of a difference Δd between a maximum value and a minimum value of the axial thickness d of the loading cam mechanism 20B shown in FIG. 13 (H>Δd/2).

Also, the cam surfaces 26, 78 are formed at portions near the inside in the radial direction facing the respective guide protrusions 87, 89 on the base end surface of the sun roller element 23 and one surface of the cam ring 53.

Figure 16:
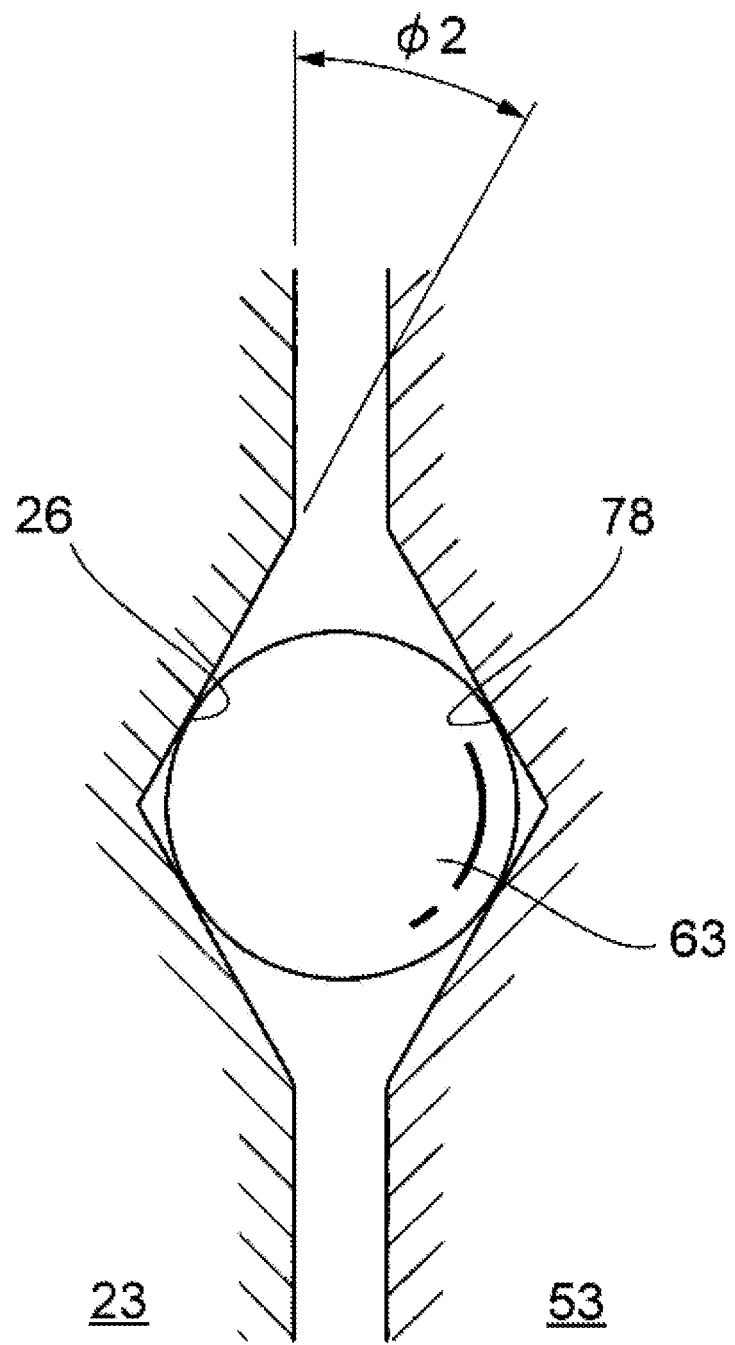
FIG. 16 is a sectional view of a cam surface and a ball, which is the same as FIG. 20A.
Figure 20A:
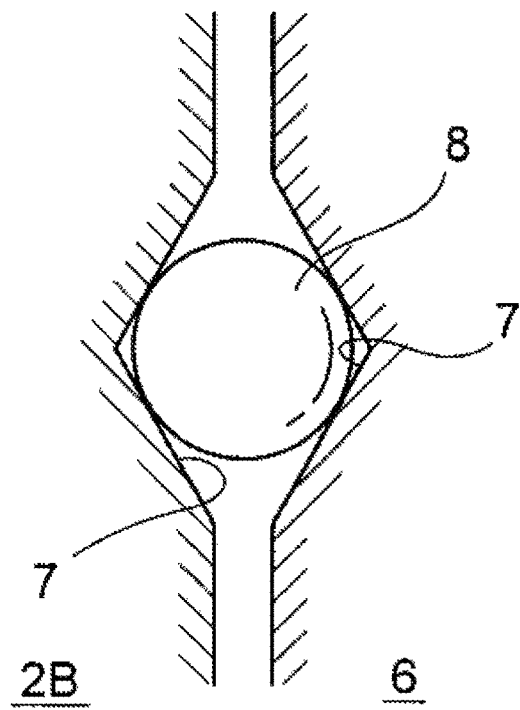
FIG. 20A is a sectional view taken along a line XX-XX of FIG. 13, pictorially illustrating a loading cam mechanism.
Figure 20B:
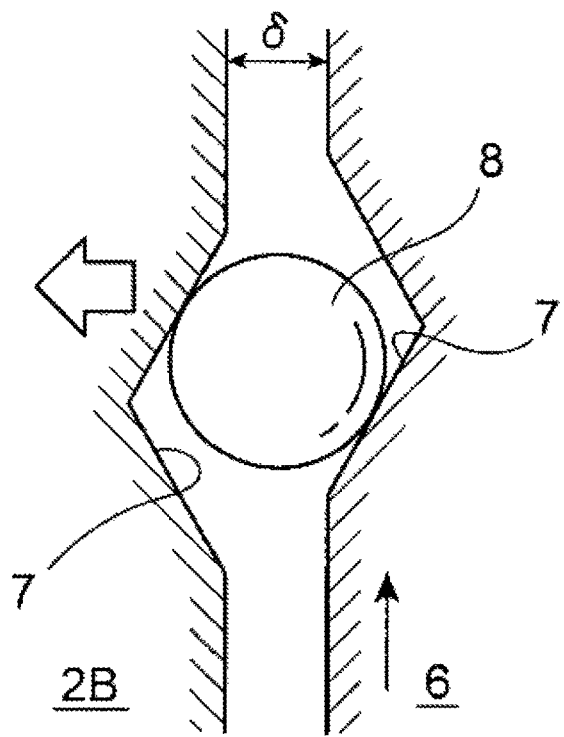
FIG. 20B is a sectional view taken along a line XX-XX of FIG. 13, pictorially illustrating the loading cam mechanism.
Figure 21:
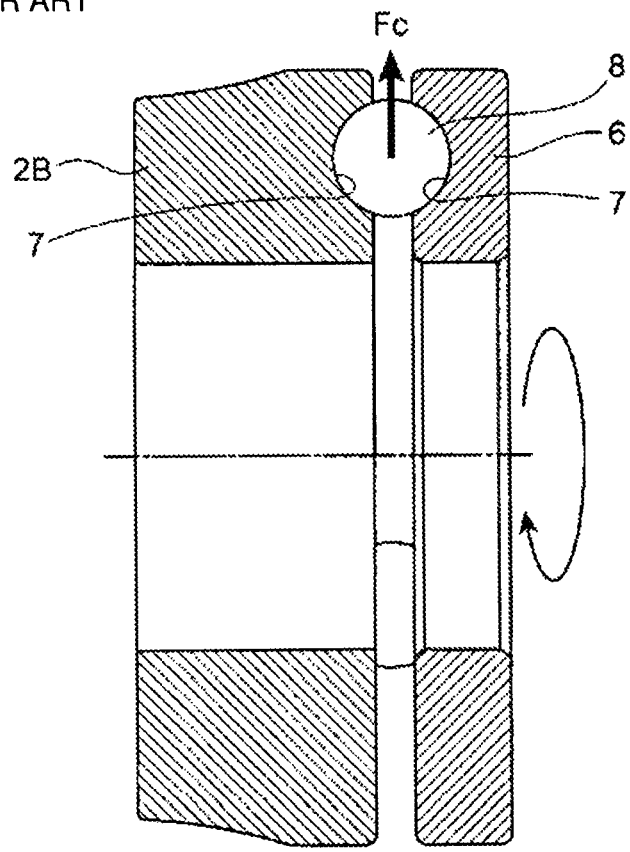
FIG. 21 is a sectional view of the cam ring and the sun roller element of the related art.
Figure 22:
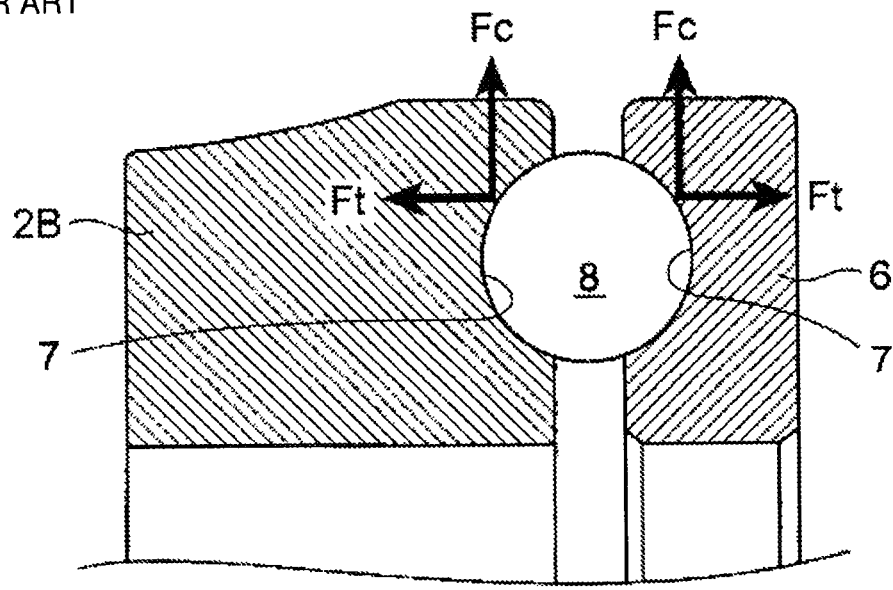
FIG. 22 is a partially enlarged sectional view of the cam ring and the sun roller element of the related art.

FIG. 16 is a sectional view of the cam surfaces 26, 78 and the ball 63, which is the same as FIG. 20A. The cam surfaces 26, 78 are recess portions of which depths in the axial direction (a horizontal direction in FIG. 16) are deepest at central portions in the circumferential direction (a vertical direction in FIG. 16) and become gradually shallow from the central portions toward both end portions in the circumferential direction.

Herein, the inclined angle of each of the guide grooves 93, 95 relative to the circumferential direction is denoted as $\phi_1$ (refer to FIG. 9), the inclined angle of each of the cam surfaces 26, 78 from the circumferential direction is denoted as $\phi_2$ (refer to FIG. 16), a distance between a central axis of the loading cam mechanism 20B and a radially central portion of each of the guide grooves 93, 95 is denoted as R, and a distance between the central axis and a radially central portion of each of the cam surfaces 26, 78 is denoted as r. In this configuration, each of the guide grooves 93, 95 and each of the cam surfaces 26, 78 are restricted to satisfy a following equation (4), except for errors not causing practical problems, such as inevitable manufacturing errors.

$$R \tan \phi_1 = r \tan \phi_2 \tag{4}$$

Thereby, it is possible to enable the tip portion of each of the guide protrusions 87, 89 and the bottom surface of each of the guide grooves 93, 95 to closely face each other, irrespective of an increase in a gap between the base end surface of the sun roller element 23 and one surface of the cam ring 53, which is caused as the riding amount of each ball 63 on each of the cam surfaces 26, 78 increases.

Also, in this configuration, the axial height H of each of the guide protrusions 87, 89 is made greater than the half of the difference Δd between the maximum value and the minimum value of the axial thickness d of the loading cam mechanism 20B. For this reason, even when the axial thickness of the gap between the base end surface of the sun roller element 23 and one surface of the cam ring 53 reaches the maximum value, the engagement between each of the guide protrusions 87, 89 and each of the guide grooves 93, 95 is not released.

In this configuration, each of the balls 63 is formed of the above-described ceramic material. For this reason, as compared to a configuration where each of the balls 63 is made of iron-based metal, it is possible to suppress the centrifugal force to be applied to each of the balls 63 when the rotary shaft rotates.

According to the friction roller-type decelerator of the third configuration example having the loading cam mechanism 20B as described above, it is possible to prevent the holding device 51 from being inclined or rattling axially, irrespective of the increase in the gap between the base end surface of the sun roller element 23 and one surface of the cam ring 53, which is caused as the loading cam mechanism 20B operates.

That is, the tip portion of each of the guide protrusions 87, 89 and the bottom surface of each of the guide grooves 93, 95 are held to closely face each other, irrespective of the increase in the gap. For this reason, when the holding device 51 tends to be axially displaced, a situation where the tip portion of each of the guide protrusions 87, 89 and the bottom surface of each of the guide grooves 93, 95 are contacted to each other and the holding device 51 is inclined or rattles axially is prevented.

In the third configuration example, the respective guide protrusions 87, 89 are formed at the parts of both axial surfaces of the holding device 51, at which the phases with respect to the circumferential direction deviate from the respective pockets 79. For this reason, an acting position of the force, which is to be applied to the holding device 51 from the inner surface of each pocket 79 on the basis of the centrifugal force to be applied to each ball 63, and an acting position of the force, which is to be applied to the holding device 51 on the basis of each of the guide protrusions 87, 89, deviate in the circumferential direction. As a result, it is possible to prevent the stress from being excessively concentrated on the part, at which each pocket 79 is formed, thereby securing the durability of the holding device 51.

Since the configurations and operations of the other parts are the same as the first configuration example, the overlapping descriptions and illustrations are omitted.

Figure 17:
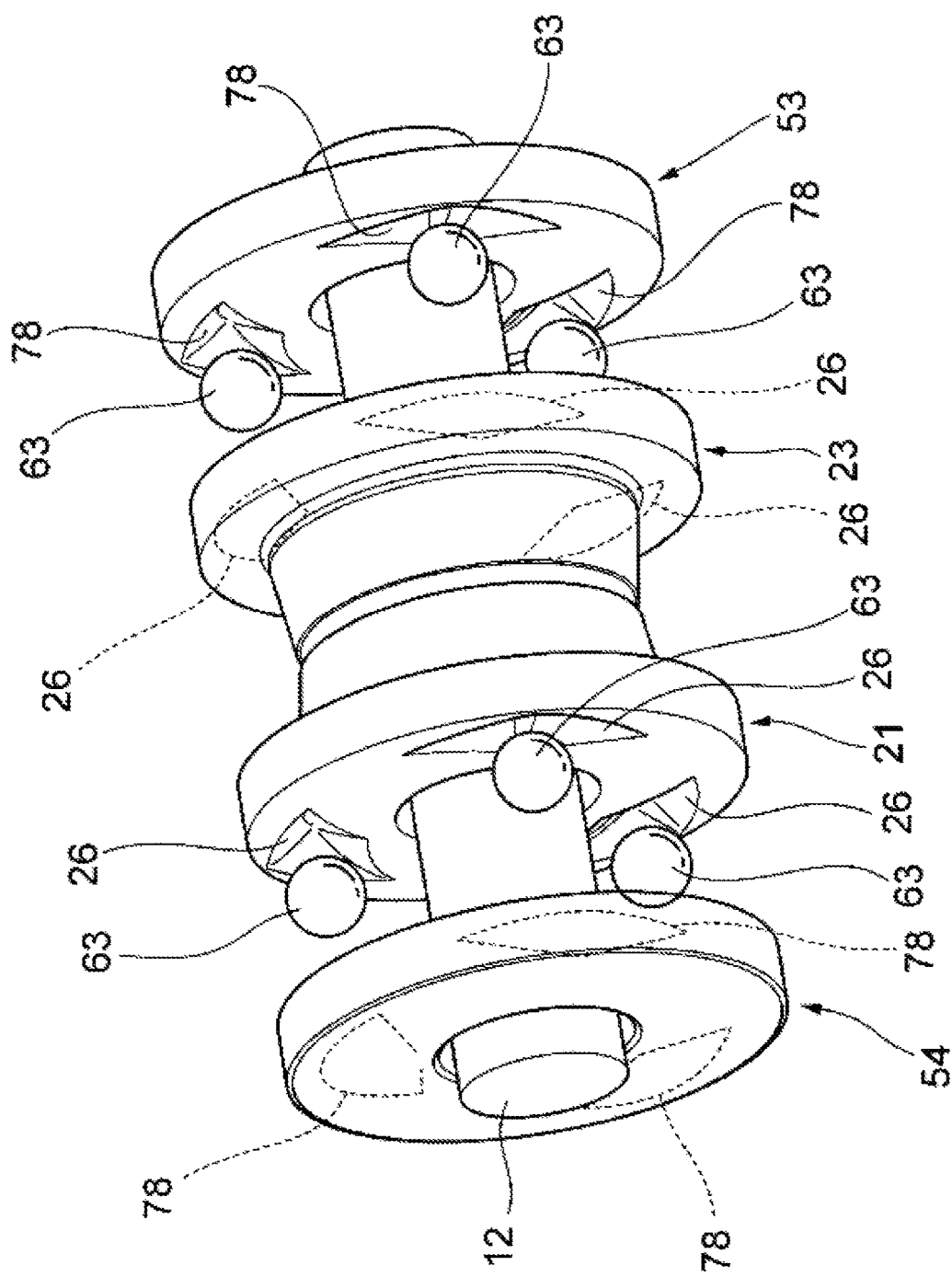
FIG. 17 depicts a modified embodiment of the third configuration of the friction roller-type transmission.
Figure 18:
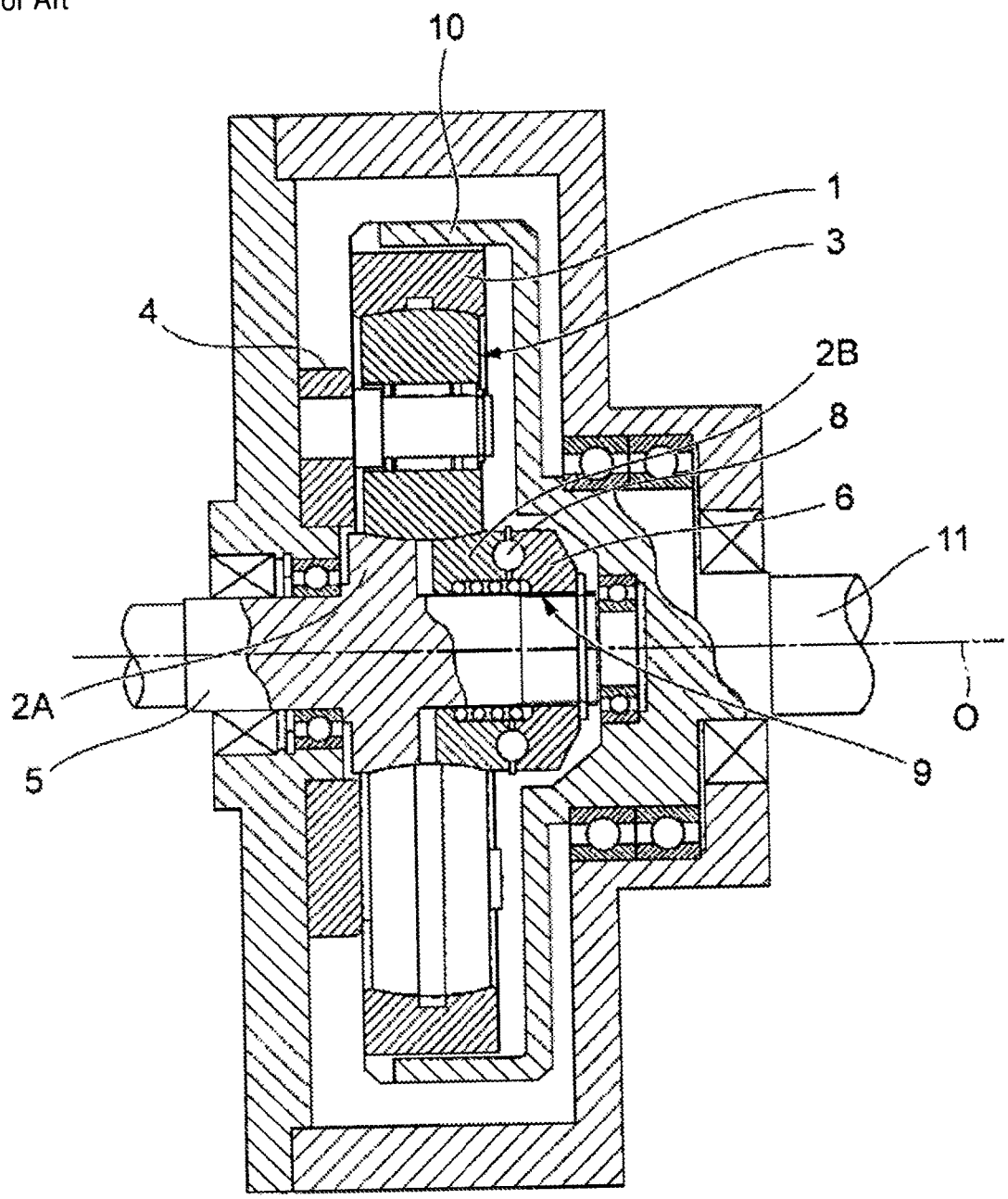
FIG. 18 is a sectional view depicting an example of a friction roller-type transmission of the related art.
Figure 19:
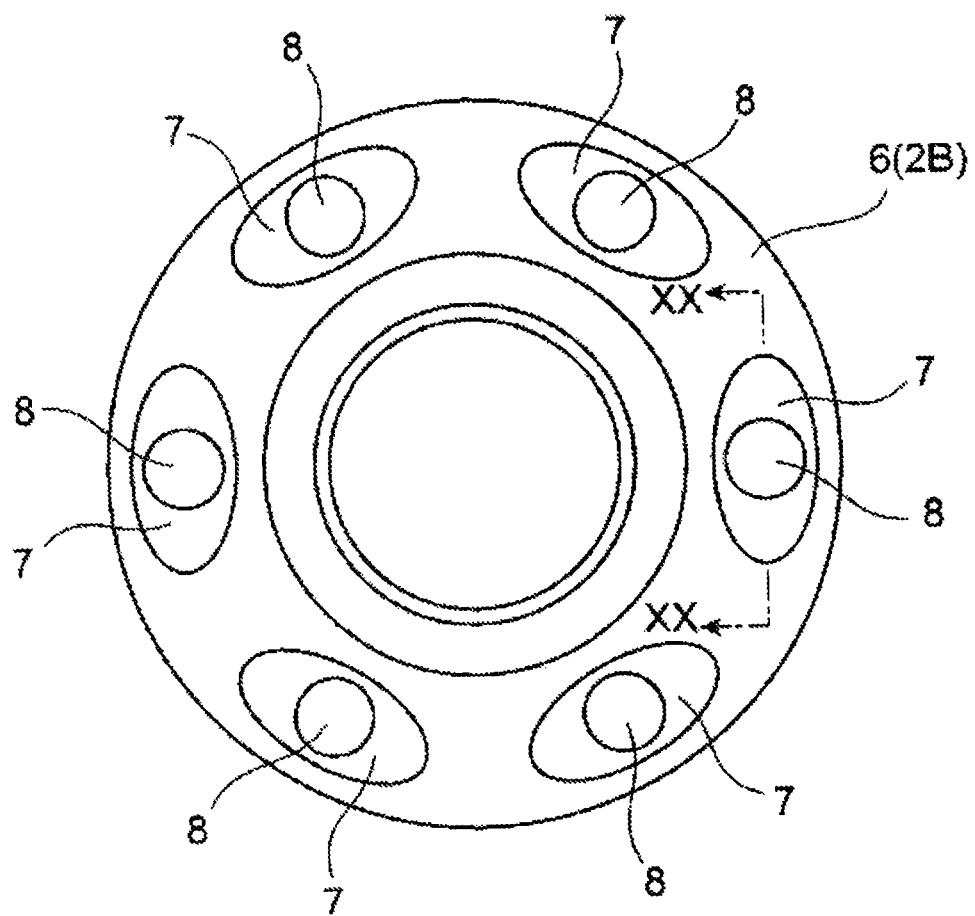
FIG. 19 is a side view depicting cam surfaces of a cam ring and a sun roller element shown in FIG. 18 and rolling elements.

FIG. 17 depicts a modified embodiment of the third configuration example of the friction roller-type transmission. The modified embodiment has the same configuration as the loading cam mechanism shown in FIG. 12, except that the holding device, the guide protrusion and the guide groove are not provided, as compared to the loading cam mechanism of FIG. 12.

Also in the modified embodiment, it is possible to estimate the increase in the axial force resulting from the rotation in planned and quantitative ways by the respective cam surfaces 26, 78. Also, it is possible to make a design capable of suppressing the gross slip in correspondence to the lowering of the limit traction coefficient $\mu_{max}$, which is the traction coefficient of the limit capable of transmitting the power, during the high-speed rotation.

Therefore, when the circumferential speed V is low, it is possible to suppress the pressing force of the traction part from excessively increasing, and when the circumferential speed V is high, it is possible to secure the necessary pressing force, so that it is possible to secure the durability and to improve the power transmission efficiency.

The present invention is not limited to the above embodiments, and combinations of the respective configurations of the embodiments and changes and modifications, which can be made on the basis of the specification and the well-known technology by one skilled in the art, are also expected by the present invention and are included within the protection scope.

For example, the loading cam mechanism 20 is not limited to the cam configuration where the ball is used as the rolling element, and may be a roller cam mechanism. Also, the cam surface may be provided for the annular roller configured to rotate.

Also, the output shaft is not limited to the configuration where it is connected to the annular roller, and the annular roller may be fixed to a housing or the like and connected to the axis of rotation of the intermediate roller. In this case, the intermediate roller is a planetary roller configured to revolve around the input shaft while rotating about its axis.

The subject application is based on a Japanese Patent Application No. 2014-107325 filed on May 23, 2014, and the contents thereof are herein incorporated by reference.

As described above, the specification discloses following matters.

(1) A friction roller-type transmission including:
an input shaft,
a sun roller disposed concentrically with the input shaft and having a rolling contact surface on an outer peripheral surface thereof,
an annular roller disposed concentrically with the sun roller at an outer periphery-side of the sun roller and having a rolling contact surface on an inner peripheral surface thereof,
a plurality of intermediate rollers supported to be rotatable about an axis of rotation arranged in parallel with the input shaft in an annular space between the rolling contact surface of the sun roller and the rolling contact surface of the annular roller and configured to rolling-contact the outer peripheral surface of the sun roller and an inner peripheral surface of the annular roller, and
an output shaft connected to an axial side surface of the annular roller or to the intermediate rollers,
wherein the sun roller includes a pair of sun roller elements divided in an axial direction of the input shaft, and
wherein at least one of the pair of sun roller elements is a moveable sun roller element configured to be freely moveable in the axial direction,
the friction roller-type transmission further including a loading cam mechanism including a first cam surface formed along a circumferential direction of the input shaft and having an axial depth gradually changing in the circumferential direction, a second cam surface disposed to face the first cam surface, a rolling element held between the first and second cam surfaces, and an annular holding device configured to hold the rolling element in a pocket, the loading cam mechanism being configured to rotate any one of the first and second cam surfaces together with the input shaft and to axially displace the moveable sun roller element, and
wherein the holding device has an inner diameter surface guiding part provided on an inner diameter surface and configured to be fitted over the input shaft and to thereby position the holding device relative to the input shaft.

(2) In the friction roller-type transmission of (1),
wherein the first cam surface is formed at a plurality of places along the circumferential direction on an outer end surface of the moveable sun roller element, which is opposite to the other sun roller element,
wherein the second cam surface is formed at a plurality of places along the circumferential direction on an end surface of a cam ring, which is disposed to face the outer end surface of the moveable sun roller element via the holding device and configured to rotate together with the input shaft, in correspondence to the first cam surfaces, and
wherein the holding device has a plurality of pockets configured to hold a plurality of the rolling elements, respectively.

(3) In the friction roller-type transmission of (2),
wherein the cam ring has a boss part extending toward the moveable sun roller element, and
wherein the inner diameter surface guiding part of the holding device is fitted and inserted to the boss part of the cam ring.

(4) In the friction roller-type transmission of (2) or (3), wherein an end surface guiding part for positioning the holding device on the input shaft in the axial direction and a rotation direction is provided between the end surface of the cam ring and the holding device and between the outer end surface of the moveable sun roller element and the holding device, respectively.

(5) In the friction roller-type transmission of (4), wherein the end surface guiding part has:

protrusions provided on both end surfaces of the holding device and protruding toward an outside of the holding device along the axial direction, and guide grooves provided for the moveable sun roller element and the cam ring and configure to guide the protrusions of the holding device to an end surface facing the holding device.

(6) In the friction roller-type transmission of (5), wherein the guide grooves have an inclination of an axial depth, which is the same as the first cam surface and the second cam surface.

(7) In the friction roller-type transmission of (5) or (6), wherein the holding device has the plurality of pockets disposed at equal intervals along the circumferential direction, and the protrusions are disposed at intermediate positions between the adjacent pockets in the circumferential direction.

(8) A friction roller-type transmission including an input shaft, a sun roller disposed concentrically with the input shaft and having a rolling contact surface on an outer peripheral surface thereof, an annular roller disposed concentrically with the sun roller at an outer periphery-side of the sun roller and having a rolling contact surface on an inner peripheral surface thereof, a plurality of intermediate rollers supported to be rotatable about an axis of rotation arranged in parallel with the input shaft in an annular space between the rolling contact surface of the sun roller and the rolling contact surface of the annular roller and configured to rolling-contact the outer peripheral surface of the sun roller and an inner peripheral surface of the annular roller, and an output shaft connected to an axial side surface of the annular roller or to the intermediate rollers, wherein the sun roller includes a pair of sun roller elements divided in an axial direction of the input shaft, and at least one of the pair of sun roller elements is a moveable sun roller element configured to be freely moveable in the axial direction, the friction roller-type transmission further including a loading part including a first cam surface formed along a circumferential direction of the input shaft and having an axial depth gradually changing in the circumferential direction, a second cam surface disposed to face the first cam surface, and a rolling element held between the first and second cam surfaces, the loading part being configured to rotate any one of the first and second cam surfaces together with the input shaft and to axially displace the moveable sun roller element, and wherein the first and second cam surfaces respectively have a shape that becomes linearly shallow from a deepest portion of the cam surface toward an outer diameter part in a radial section.

DESCRIPTION OF REFERENCE NUMERALS

12: input shaft, 13: sun roller, 15: annular roller, 17: intermediate roller, 19: output shaft, 20, 20A, 20B, 20C: loading cam mechanism, 21: sun roller element, 23: sun roller element (moveable sun roller element), 25, 27: facing end surface, 35, 37: outer end surface, 51, 51A: holding device, 53, 53A: cam ring, 63: rolling element, 69: loading part, 75, 26: first cam surface, 77, 78: second cam surface, 79: pocket, 81, 81A: inner diameter surface guiding part, 100: friction roller-type transmission

The invention claimed is:

1. A friction roller-type transmission comprising:
   an input shaft,
   a sun roller disposed concentrically with the input shaft and having a rolling contact surface on an outer peripheral surface thereof,
   an annular roller disposed concentrically with the sun roller at an outer periphery-side of the sun roller and having a rolling contact surface on an inner peripheral surface thereof,
   a plurality of intermediate rollers supported to be rotatable about an axis of rotation arranged in parallel with the input shaft in an annular space between the rolling contact surface of the sun roller and the rolling contact surface of the annular roller and configured to rolling-contact the outer peripheral surface of the sun roller and an inner peripheral surface of the annular roller, and
   an output shaft connected to an axial side surface of the annular roller or to the intermediate rollers,
   wherein the sun roller includes a pair of sun roller elements divided in an axial direction of the input shaft, and
   wherein at least one of the pair of sun roller elements is a moveable sun roller element configured to be freely moveable in the axial direction,
   the friction roller-type transmission further comprising a loading cam mechanism including a first cam surface formed along a circumferential direction of the input shaft and having an axial depth gradually changing in the circumferential direction, a second cam surface disposed to face the first cam surface, a rolling element held between the first and second cam surfaces, and an annular holding device configured to hold the rolling element in a pocket, the loading cam mechanism being configured to rotate any one of the first and second cam surfaces together with the input shaft and to axially displace the moveable sun roller element, and
   wherein the holding device comprises an inner diameter surface guiding part provided on an inner diameter surface and configured to be fitted over the input shaft and to thereby position the holding device relative to the input shaft.

2. The friction roller-type transmission according to claim 1,
   wherein the first cam surface is formed at a plurality of places along the circumferential direction on an outer end surface of the moveable sun roller element, which is opposite to the other sun roller element,
   wherein the second cam surface is formed at a plurality of places along the circumferential direction on an end surface of a cam ring, which is disposed to face the outer end surface of the moveable sun roller element via the holding device and configured to rotate together with the input shaft, in correspondence to the first cam surfaces, and
   wherein the holding device comprises a plurality of pockets configured to hold a plurality of the rolling elements, respectively.

3. The friction roller-type transmission according to claim 2, wherein the cam ring has a boss part extending toward the moveable sun roller element, and wherein the inner diameter surface guiding part of the holding device is fitted and inserted to the boss part of the cam ring.

4. The friction roller-type transmission according to claim 2, wherein an end surface guiding part for positioning the holding device on the input shaft in the axial direction and a rotation direction is provided between the end surface of the cam ring and the holding device and between the outer end surface of the moveable sun roller element and the holding device, respectively.

5. The friction roller-type transmission according to claim 4, wherein the end surface guiding part comprises:

protrusions provided on both end surfaces of the holding device and protruding toward an outside of the holding device along the axial direction, and guide grooves provided for the moveable sun roller element and the cam ring and configure to guide the protrusions of the holding device to an end surface facing the holding device.

6. The friction roller-type transmission according to claim 5, wherein the guide grooves have an inclination of an axial depth, which is the same as the first cam surface and the second cam surface.

7. The friction roller-type transmission according to claim 5, wherein the holding device has the plurality of pockets disposed at equal intervals along the circumferential direction, and the protrusions are disposed at intermediate positions between the adjacent pockets in the circumferential direction.

* * * * *